(12) United States Patent
Bishop et al.

(10) Patent No.: US 10,984,011 B1
(45) Date of Patent: Apr. 20, 2021

(54) DISTRIBUTING NON-TRANSACTIONAL WORKLOAD ACROSS MULTIPLE DATABASE SERVERS

(71) Applicant: ALLSCRIPTS SOFTWARE, LLC, Chicago, IL (US)

(72) Inventors: William Harmon Bishop, Raleigh, NC (US); Larry Eugene Horton, Wake Forest, NC (US); Richard Patrick Scruggs, Fuquay-Varina, NC (US)

(73) Assignee: Allscripts Software, LLC, Chicago, IL (US)

( * ) Notice: Subject to any disclaimer, the term of this patent is extended or adjusted under 35 U.S.C. 154(b) by 378 days.

(21) Appl. No.: 15/859,587

(22) Filed: Dec. 31, 2017

(51) Int. Cl.
*G06F 16/25* (2019.01)
*G06F 9/50* (2006.01)
*G06F 9/48* (2006.01)
*G06F 16/27* (2019.01)
*G06F 16/23* (2019.01)

(52) U.S. Cl.
CPC .......... *G06F 16/254* (2019.01); *G06F 9/4881* (2013.01); *G06F 9/5083* (2013.01); *G06F 16/2379* (2019.01); *G06F 16/27* (2019.01)

(58) Field of Classification Search
USPC ....................................................... 707/602
See application file for complete search history.

(56) References Cited

U.S. PATENT DOCUMENTS

| 2002/0129294 | A1* | 9/2002 | Pedone et al. | G06F 17/30 714/4.3 |
| 2005/0071211 | A1* | 3/2005 | Flockhart et al. | H04M 3/50 705/28 |
| 2010/0036894 | A1* | 2/2010 | Senda et al. | G06F 17/30 707/E17.005 |
| 2018/0249443 | A1* | 8/2018 | Li et al. | H04W 72/00 |

* cited by examiner

*Primary Examiner* — Muluemebet Gurmu
(74) *Attorney, Agent, or Firm* — Loza & Loza, LLP; Peter Zura

(57) ABSTRACT

A method for distributing non-transactional workload in the form of online analytical processing (OLAP) load across multiple database servers comprises receiving, at a scheduler server, a plurality of asynchronous work requests, adding, by the scheduler server, each of the received asynchronous work requests to a work list queue as a work item, and determining, by a scheduler module of the scheduler server, a first work item from the work list queue to select for performance by the first thread of the application server. In accordance with one or more preferred implementations, the first work item is selected utilizing a methodology which determines a number of work items in the work list queue having a processing status that are assigned to a database server, and based thereon determines whether an additional work request can be assigned to that database server without exceeding a request threshold for that database server.

20 Claims, 41 Drawing Sheets

DB Server for Customers 1-10000

DB Server for Customers 10001-20000

DB Server for Customers 20001-30000

DB Server for Customers 30001-40000

```
CREATE TABLE Queue (
    [id] [int] IDENTITY(1,1) NOT NULL,
    [status] [smallint] NOT NULL,
    [weight] [int] NOT NULL,
    [_serverid] [int] NOT NULL,
    [create_dttm] [datetime] NOT NULL,
    [update_dttm] [datetime] NULL,
    [is_deleted] [bit] NOT NULL
)
..
..
Dequeue:

declare @MaxWorkers int = 2
;with dequeue_cte as
(
    select top 1 q.id, p.payload, status, weight, _serverid, create_dttm
    from Queue q
    INNER JOIN QueuePayload p ON q.id = p.id
    where _serverid =
        (select top 1 _serverid from
            (
                select _serverid, sum(weight) weight
                from Queue
                where status = 0
                and _serverid not in
                    -- servers that are not currently maxed out
                    (select _serverid from Queue
                    where status = 1
                    group by _serverid
                    having count(_serverid) >= @MaxWorkers
                    )
                group by _serverid
            ) s order by weight desc
        )
    AND status = 0
    order by weight desc
)
--select * from dequeue_cte
UPDATE dequeue_cte SET
    status = 1 -- processing
OUTPUT inserted.id, inserted.create_dttm as CreateDttm, deleted.payload,
inserted.status
```

FIG. 37

DISTRIBUTING NON-TRANSACTIONAL WORKLOAD ACROSS MULTIPLE DATABASE SERVERS

INCORPORATION BY REFERENCE

The present application hereby incorporates herein by reference the entire disclosure of Appendix A submitted herewith.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to systems and methods for distributing non-transactional workload such as online analytical processing (OLAP) load across multiple database servers.

In a conventional client/server architecture, clients issue many small transactions to a cluster of servers. With such a conventional client/server architecture for a transactional system, a load balancer is frequently used to distribute transaction load equally across such a cluster of servers.

In anon-transactional system, such as a system for online analytical processing (OLAP), it is much more challenging to distribute load.

This can be seen via consideration of a conventional approach for a large data warehouse that is known as a data-dependent routing data warehouse. In this form of data warehouse, a plurality of database servers are utilized, and a consumer of data (e.g. a customer) needs to know which database instance (e.g. which database server) it needs to access or store data in.

Frequently, this involves use of a simple lookup table, e.g. indicating that customer one has data stored in database server one and customer seven has data stored in database server two.

Optionally, there can be a middleware layer to abstract the internal infrastructure of the warehouse. Notably, though, the middleware then becomes a potential bottleneck itself, and further requires additional expense to build and maintain.

FIG. 1 illustrates an exemplary conventional system implementing a data-dependent routing data warehouse approach where a middleware server providing web application programming interfaces (APIs) is configured to handle incoming requests and route them to the appropriate database server based on a customer number associated with an incoming request (as illustrated in FIGS. 1-2).

Under some approaches, such a middleware layer may also be responsible for balancing load across the database servers as well. For example, the middleware could be configured to reject a query if a server is already too busy.

However, building and maintaining such middleware is extremely expensive (e.g. costs time and money) in data rich domains (such as healthcare). For example, it would be necessary to understand each customer's needs and build, expose, and maintain a large number of application programming interfaces (APIs) to handle incoming requests. Generally, it would require a large team to maintain such middleware.

Accordingly, data-dependent routing data warehouse approaches are often deployed without a middleware layer. Instead, each external application is responsible for querying database servers directly, as illustrated in FIG. 3. Notably, queries can come from an application server or even an application server cluster, as illustrated in FIG. 4.

Although it is relatively easy for an application to look up the appropriate database server to query, there exists the problem that many applications may query the same database server at the same time, overloading that database server, as illustrated in FIG. 5.

Notably, in a data warehouse environment, often queries are not real-time critical, and do not need to be processed immediately. For example, a first application may have a certain set of work that needs to be performed for several hundred customers nightly, such as generating an executive summary report. A second application may be responsible for extract, transform, and load operations to a data mart. A third application may be responsible for updating customer data with new information that was received in a nightly batch. Although none of these applications have real-time critical work, if there is no coordination between these applications, then a database server can become overloaded if they all query the same database server at the same time. Coordination is needed between different applications to ensure a database server doesn't become overloaded.

Moreover, because many applications are multi-threaded, it is possible for a single application to overload a server with multiple requests from different threads. FIG. 6 illustrates an exemplary scenario in which this might be case. In this scenario, an executive summary report application is scheduled to run late at night and determines that seven customer reports need to be generated. The application supports multi-threading and can issue up to four simultaneous requests to complete the work quicker. However, it just so happens that the list of customers is unsorted, and the first four requests are issued simultaneously to the same database server because the first four customers are all located on that server. Although the database servers are built to handle many simultaneous requests, the database does not have infinite resources; there are memory, processing, and disk limitations. Thus, coordination is needed between different threads of the same application to ensure a database server doesn't become overloaded.

Additionally, it may be that many instances of a particular application server are needed to meet demand, and an application server cluster may even be needed. Coordination is needed between different instances of a particular application server to ensure a database server doesn't become overloaded.

One conventional approach for trying to obviate the possibility of a database server being overloaded is to utilize a resource governor built into the database. For example, Microsoft SQL Server has a resource governor which allows an administrative user to set limits on how much of a database server's processing and memory may be consumed by a single user group. For example, all calls from a particular customer may be limited to consume at most 50% of a database server's processing and memory, and may be throttled if they are at risk of exceeding that threshold. Notably, though, while this approach may help obviate the possibility that a database server becomes overloaded, it doesn't necessarily help get a volume of work done any faster.

Overall, needs exist for improvement in distributing non-transactional workload such as online analytical processing (OLAP) load across multiple database servers. These needs and other needs are addressed by one or more aspects of the present invention.

SUMMARY OF THE INVENTION

The present invention includes many aspects and features. Moreover, while many aspects and features relate to, and are described in, the context of online analytical processing (OLAP) for healthcare, the present invention is not limited to use only in this context, as will become apparent from the following summaries and detailed descriptions of aspects, features, and one or more embodiments of the present invention.

Accordingly, one aspect of the present invention relates to a method providing a technical solution to a technical problem of distributing non-transactional workload in the form of online analytical processing (OLAP) load across multiple database servers. The method includes receiving, at a scheduler server, a plurality of asynchronous work requests. The method further includes adding, by the scheduler server, each of the received asynchronous work requests to a work list queue as a work item, each respective work item including an indication of a customer for the corresponding work request, an indication of a database server required for execution of the corresponding work request, an indication of a status of the respective work item, and an indication of a weight value representing a complexity of the corresponding work request. The method further includes receiving, at a scheduler module of the scheduler server, a message from an application server indicating that a first thread of the application server is ready for work. The method further includes determining, by the scheduler module of the scheduler server, a first work item from the work list queue to select for performance by the first thread of the application server. Such determining of the first work item comprises selecting a first set of work items in the work list queue by determining, for each respective work item in the work list queue indicated to have a pending status, whether assignment of the corresponding work request to the database server indicated for the respective work item would cause that database server to exceed a request threshold of that database server, and adding to the first set of work items each work item for which it was determined that assignment of the corresponding work request to the database server indicated for that work item would not cause that database server to exceed the request threshold of that database server, Determining of the first work item further comprises selecting a target database server by for each respective database server indicated for one of the first set of work items, calculating a current total weight value for the respective database server by summing indicated weight values for all work items of the work list queue that indicate assignment to that respective database server, and are indicated to have a processing status, selecting the database server having the lowest calculated current total weight value. Determining of the first work item further comprises selecting the first work item by determining, from the first set of work items, a second set of work items that has the selected target database server indicated, and selecting, from the second set of work items, the work item that has the highest indicated weight value as the first work item. The method further comprises communicating, from the scheduler module to the application server, a communication instructing the application server to execute the work request corresponding to the selected first work item utilizing the first thread of the application server.

In a feature of this aspect, the method further comprises updating an indicated status of the first work item to processing.

In a feature of this aspect, the method further comprises performing, by the first thread of the application server, work to complete the work request corresponding to the selected first work item.

In a feature of this aspect, performing, by the first thread of the application server, work to complete the work request corresponding to the selected first work item comprises accessing the database server indicated in the first work item.

In a feature of this aspect, performing, by the first thread of the application server, work to complete the work request corresponding to the selected first work item comprises accessing the database server indicated in the first work item, and wherein the method further comprises, prior to accessing the database server indicated in the first work item, acquiring, by the first thread of the application server, an application lock for the database server indicated in the first work item.

In a feature of this aspect, the method further comprises checking, by an auditor module of the scheduler server, for the existence of an application lock on the database server indicated in the first work item to attempt to determine whether the first thread of the first application server has crashed.

In a feature of this aspect, the method further comprises checking, by an auditor module of the scheduler server, for the existence of an application lock on the database server indicated in the first work item to attempt to determine whether the first thread of the first application server has crashed, and based thereon, effecting updating of an indicated status of the first work item to pending.

In a feature of this aspect, the method further comprises completing, by the first thread of the application server, the work request corresponding to the first work item.

In a feature of this aspect, the method further comprises completing, by the first thread of the application server, the work request corresponding to the first work item, and communicating, from the application server to the scheduler module, a message indicating that the first thread of the application server is ready for work.

In a feature of this aspect, the method further comprises receiving, at the scheduler module of the scheduler server, a message from the application server indicating that the first thread of the application server is ready for work, and based thereon updating an indicated status of the first work item to complete.

In a feature of this aspect, the scheduler server comprises a plurality of work list queues, each work list queue being a work list queue for a different application.

In a feature of this aspect, the work list queue includes work items for a plurality of different applications, and each work item in the work list queue includes an indication of a needed application.

In a feature of this aspect, the scheduler server comprises a plurality of scheduler modules, each scheduler module being a scheduler module for a different application.

In a feature of this aspect, the received plurality of asynchronous work requests comprises a work request based on a timer based job.

In a feature of this aspect, the received plurality of asynchronous work requests comprises a work request based on a user request from a web site.

In a feature of this aspect, the target database server comprises a structured query language (SQL) server.

In a feature of this aspect, the method further comprises receiving, at the scheduler module of the scheduler server, a message from the application server indicating that a second thread of the application server is ready for work, and determining, by the scheduler module of the scheduler server, a second work item from the work list queue to select for performance by the second thread of the application server. Such determining of the second work item comprises selecting a third set of work items in the work list queue by determining, for each respective work item in the work list queue indicated to have a pending status, whether assignment of the corresponding work request to the database server indicated for the respective work item would cause that database server to exceed a request threshold of that database server, and adding to the third set of work items each work item for which it was determined that assignment of the corresponding work request to the database server indicated for that work item would not cause that database server to exceed the request threshold of that database server. Determining of the second work item further comprises selecting a second target database server by for each respective database server indicated for one of the third set of work items, calculating a current total weight value for the respective database server by summing indicated weight values for all work items of the work list queue that indicate assignment to that respective database server, and are indicated to have a processing status, and selecting the database server having the lowest calculated current total weight value. Determining of the second work item further comprises selecting the second work item by determining, from the third set of work items, a fourth set of work items that has the selected target database server indicated, and selecting, from the fourth set of work items, the work item that has the highest indicated weight value as the first work item. In this feature of this aspect, the method further comprises communicating, from the scheduler module to the application server, a communication instructing the application server to execute the work request corresponding to the selected second work item utilizing the second thread of the application server.

In a feature of this aspect, the method further comprises receiving, at the scheduler module of the scheduler server, a message from a second application server indicating that a second thread of the second application server is ready for work, and determining, by the scheduler module of the scheduler server, a second work item from the work list queue to select for performance by the second thread of the second application server. Such determining of the second work item comprises selecting a third set of work items in the work list queue by determining, for each respective work item in the work list queue indicated to have a pending status, whether assignment of the corresponding work request to the database server indicated for the respective work item would cause that database server to exceed a request threshold of that database server, and adding to the third set of work items each work item for which it was determined that assignment of the corresponding work request to the database server indicated for that work item would not cause that database server to exceed the request threshold of that database server. Determining of the second work item further comprises selecting a second target database server by for each respective database server indicated for one of the third set of work items, calculating a current total weight value for the respective database server by summing indicated weight values for all work items of the work list queue that indicate assignment to that respective database server, and are indicated to have a processing status, and selecting the database server having the lowest calculated current total weight value. Determining of the second work item further comprises selecting the second work item by determining, from the third set of work items, a fourth set of work items that has the selected target database server indicated, and selecting, from the fourth set of work items, the work item that has the highest indicated weight value as the first work item. In this feature of this aspect, the method further comprises communicating, from the scheduler module to the second application server, a communication instructing the second application server to execute the work request corresponding to the selected second work item utilizing the second thread of the second application server.

Another aspect relates to a method providing a technical solution to a technical problem of distributing non-transactional workload in the form of online analytical processing (OLAP) load across multiple database servers. The method includes receiving, at a scheduler server, a plurality of asynchronous work requests. The method further includes adding, by the scheduler server, each of the received asynchronous work requests to a work list queue as a work item, each respective work item including an indication of a customer for the corresponding work request, an indication of a database server required for execution of the corresponding work request, an indication of a status of the respective work item, and an indication of a weight value representing a complexity of the corresponding work request. The method further includes receiving, at a scheduler module of the scheduler server, a message from an application server cluster indicating that a first thread of the application server cluster is ready for work. The method further includes determining, by the scheduler module of the scheduler server, a first work item from the work list queue to select for performance by the first thread of the application server cluster. Such determining of the first work item comprises selecting a first set of work items in the work list queue by determining, for each respective work item in the work list queue indicated to have a pending status, whether assignment of the corresponding work request to the database server indicated for the respective work item would cause that database server to exceed a request threshold of that database server, and adding to the first set of work items each work item for which it was determined that assignment of the corresponding work request to the database server indicated for that work item would not cause that database server to exceed the request threshold of that database server. Determining of the first work item further comprises selecting a target database server by, for each respective database server indicated for one of the first set of work items, calculating a current total weight value for the respective database server by summing indicated weight values for all work items of the work list queue that indicate assignment to that respective database server, and are indicated to have a processing status, and selecting the database server having the lowest calculated current total weight value. Selecting the first work item further comprises selecting the first work item by determining, from the first set of work items, a second set of work items that has the selected target database server indicated, and selecting, from the second set of work items, the work item that has the highest indicated weight value as the first work item. The method further includes communicating, from the scheduler module to the application server cluster, a communication instructing the application server cluster to execute the work request corresponding to the selected first work item utilizing the first thread of the application server cluster.

Another aspect relates to a method providing a technical solution to a technical problem of distributing non-transactional workload in the form of online analytical processing (OLAP) load across multiple database servers. The method includes receiving, at a scheduler server, a plurality of asynchronous work requests. The method further includes adding, by the scheduler server, each of the received asynchronous work requests to a work list queue as a work item, each respective work item including an indication of a customer for the corresponding work request, an indication of a database server required for execution of the corresponding work request, an indication of a status of the respective work item, and an indication of a weight value representing a complexity of the corresponding work request. The method further includes receiving, at a scheduler module of the scheduler server, a message from an application server indicating that a thread of the application server is ready for work. The method further includes determining, by the scheduler module of the scheduler server, a first work item from the work list queue to select for execution by the application server. Such determining of the first work item comprises selecting a first set of work items in the work list queue by determining, for each respective work item in the work list queue indicated to have a pending status, whether assignment of the corresponding work request to the database server indicated for the respective work item would cause that database server to exceed a request threshold of that database server, and adding to the first set of work items each work item for which it was determined that assignment of the corresponding work request to the database server indicated for that work item would not cause that database server to exceed the request threshold of that database server. Determining of the first work item further comprises selecting a target database server by for each respective database server indicated for one of the first set of work items, calculating a current total weight value for the respective database server by summing indicated weight values for all work items of the work list queue that indicate assignment to that respective database server, and are indicated to have a processing status, and selecting the database server having the lowest calculated current total weight value. Selecting the first work item further comprises selecting the first work item by determining, from the first set of work items, a second set of work items that has the selected target database server indicated, and selecting, from the second set of work items, the work item that has the highest indicated weight value as the first work item. The method further includes communicating, from the scheduler module to the application server, a communication instructing the application server to execute the work request corresponding to the selected first work item.

Another aspect relates to a method providing a technical solution to a technical problem of distributing non-transactional workload in the form of online analytical processing (OLAP) load across multiple database servers. The method includes receiving, at a scheduler server, a plurality of asynchronous work requests. The method further includes adding, by the scheduler server for each respective received work request, a work item to a work list queue that includes work request information from a payload of the corresponding work request, an indication of a customer for the corresponding work request, an indication of a database server required for execution of the corresponding work request, an indication of a status of the respective work item, and an indication of a weight value representing a complexity of the corresponding work request. The method further includes receiving, at a scheduler module of the scheduler server, a message from an application server indicating that a first thread of the application server is ready for work. The method further includes determining, by the scheduler module of the scheduler server, a first work item from the work list queue to select for performance by the first thread of the application server. Determining the first work item comprises selecting a first set of work items in the work list queue by determining, for each respective work item in the work list queue indicated to have a pending status, whether assignment of the corresponding work request to the database server indicated for the respective work item would cause that database server to exceed a request threshold of that database server, and adding to the first set of work items each work item for which it was determined that assignment of the corresponding work request to the database server indicated for that work item would not cause that database server to exceed the request threshold of that database server. Determining the first work item further comprises selecting a target database server by for each respective database server indicated for one of the first set of work items, calculating a current total weight value for the respective database server by summing indicated weight values for all work items of the work list queue that indicate assignment to that respective database server, and are indicated to have a processing status, and selecting the database server having the lowest calculated current total weight value. Determining the first work item further comprises selecting the first work item by determining, from the first set of work items, a second set of work items that has the selected target database server indicated, and selecting, from the second set of work items, the work item that has the highest indicated weight value as the first work item. The method further includes communicating, from the scheduler module to the application server, a communication instructing the application server to execute the work request corresponding to the selected first work item utilizing the first thread of the application server.

Another aspect relates to a method providing a technical solution to a technical problem of distributing non-transactional workload in the form of online analytical processing (OLAP) load across multiple database servers. The method includes receiving, at a scheduler server, a plurality of asynchronous work requests. The method further includes, at the scheduler server, for each respective received asynchronous work request, determining an application associated with the received work request, and based on the respective received work request, adding a work item to a work list queue associated with the determined application, the work item including work request information from a payload of the corresponding work request, an indication of a customer for the corresponding work request, an indication of a database server required for execution of the corresponding work request, an indication of a status of the respective work item, and an indication of a weight value representing a complexity of the corresponding work request. The method further includes receiving, at a scheduler module of the scheduler server, a message from a first application server for a first application indicating that a first thread of the first application server is ready for work. The method further includes determining, by the scheduler module of the scheduler server, a first work item from the work list queue for the first application to select for performance by the first thread of the first application server. Determining the first work item comprises selecting a first set of work items in the work list queue for the first application by determining, for each respective work item in the work list queue for the first application indicated to have a pending status, whether assignment of the corresponding work request to the database server indicated for the respective work item would cause that database server to exceed a request threshold of that database server, and adding to the first set of work items each work item for which it was determined that assignment of the corresponding work request to the database server indicated for that work item would not cause that database server to exceed the request threshold of that database server. Determining the first work item further comprises selecting a target database server by, for each respective database server indicated for one of the first set of work items, calculating a current total weight value for the respective database server by summing indicated weight values for all work items of the work list queue for the first application that indicate assignment to that respective database server, and are indicated to have a processing status, and selecting the database server having the lowest calculated current total weight value. Determining the first work item further comprises selecting the first work item by determining, from the first set of work items, a second set of work items that has the selected target database server indicated, and selecting, from the second set of work items, the work item that has the highest indicated weight value as the first work item. The method further includes communicating, from the scheduler module to the first application server, a communication instructing the first application server to execute the work request corresponding to the selected first work item utilizing the first thread of the first application server.

In a feature of this aspect, the method further comprises updating an indicated status of the first work item to processing.

In a feature of this aspect, the method further comprises performing, by the first thread of the first application server, work to complete the work request corresponding to the selected first work item.

In a feature of this aspect, performing, by the first thread of the first application server, work to complete the work request corresponding to the selected first work item comprises accessing the database server indicated in the first work item.

In a feature of this aspect, performing, by the first thread of the first application server, work to complete the work request corresponding to the selected first work item comprises accessing the database server indicated in the first work item, and wherein the method further comprises, prior to accessing the database server indicated in the first work item, acquiring, by the first thread of the first application server, an application lock for the database server indicated in the first work item.

In a feature of this aspect, the method further comprises checking, by an auditor module of the scheduler server, for the existence of an application lock on the database server indicated in the first work item to attempt to determine whether the first thread of the first application server has crashed.

In a feature of this aspect, the method further comprises checking, by an auditor module of the scheduler server, for the existence of an application lock on the database server indicated in the first work item to attempt to determine whether the first thread of the first application server has crashed, and, based thereon, effecting updating of an indicated status of the first work item to pending.

In a feature of this aspect, the method further comprises completing, by the first thread of the first application server, the work request corresponding to the first work item.

In a feature of this aspect, the method further comprises completing, by the first thread of the first application server, the work request corresponding to the first work item, and communicating, from the first application server to the scheduler module, a message indicating that the first thread of the first application server is ready for work.

In a feature of this aspect, the method further comprises receiving, at the scheduler module of the scheduler server, a message from the first application server indicating that the first thread of the first application server is ready for work, and based thereon updating an indicated status of the first work item to complete.

In a feature of this aspect, the scheduler server comprises a plurality of scheduler modules, each scheduler module being a scheduler module for a different application.

In a feature of this aspect, the received plurality of asynchronous work requests comprises a work request based on a timer based job.

In a feature of this aspect, the received plurality of asynchronous work requests comprises a work request based on a user request from a web site.

In a feature of this aspect, the target database server comprises a structured query language (SQL) server.

In a feature of this aspect, the method further comprises receiving, at the scheduler module of the scheduler server, a message from the first application server for the first application indicating that a second thread of the first application server is ready for work, and determining, by the scheduler module of the scheduler server, a second work item from the work list queue for the first application to select for performance by the second thread of the first application server. Determining the second work item comprises selecting a third set of work items in the work list queue for the first application by determining, for each respective work item in the work list queue for the first application indicated to have a pending status, whether assignment of the corresponding work request to the database server indicated for the respective work item would cause that database server to exceed a request threshold of that database server, and adding to the third set of work items each work item for which it was determined that assignment of the corresponding work request to the database server indicated for that work item would not cause that database server to exceed the request threshold of that database server. Determining the second work item further comprises selecting a target database server by, for each respective database server indicated for one of the third set of work items, calculating a current total weight value for the respective database server by summing indicated weight values for all work items of the work list queue for the first application that indicate assignment to that respective database server, and are indicated to have a processing status, and selecting the database server having the lowest calculated current total weight value. Determining the second work item further comprises selecting the second work item by determining, from the third set of work items, a fourth set of work items that has the selected target database server indicated, and selecting, from the fourth set of work items, the work item that has the highest indicated weight value as the second work item. In this feature of this aspect, the method further comprises communicating, from the scheduler module to the first application server, a communication instructing the first application server to execute the work request corresponding to the selected second work item utilizing the second thread of the first application server.

In a feature of this aspect, the method further comprises receiving, at the scheduler module of the scheduler server, a message from a second application server for the first application indicating that a second thread of the second application server is ready for work, and determining, by the scheduler module of the scheduler server, a second work item from the work list queue for the first application to select for performance by the second thread of the second application server. Determining the second work item comprises selecting a third set of work items in the work list queue for the first application by determining, for each respective work item in the work list queue for the first application indicated to have a pending status, whether assignment of the corresponding work request to the database server indicated for the respective work item would cause that database server to exceed a request threshold of that database server, and adding to the third set of work items each work item for which it was determined that assignment of the corresponding work request to the database server indicated for that work item would not cause that database server to exceed the request threshold of that database server. Determining the second work item further comprises selecting a target database server by, for each respective database server indicated for one of the third set of work items, calculating a current total weight value for the respective database server by summing indicated weight values for all work items of the work list queue for the first application that indicate assignment to that respective database server, and are indicated to have a processing status, and selecting the database server having the lowest calculated current total weight value. Determining the second work item further comprises selecting the second work item by determining, from the third set of work items, a fourth set of work items that has the selected target database server indicated, and selecting, from the fourth set of work items, the work item that has the highest indicated weight value as the second work item. In this feature of this aspect, the method further comprises communicating, from the scheduler module to the second application server, a communication instructing the second application server to execute the work request corresponding to the selected second work item utilizing the second thread of the second application server.

In a feature of this aspect, the method further comprises receiving, at the scheduler module of the scheduler server, a message from a second application server for a second application indicating that a second thread of the second application server is ready for work, and determining, by the scheduler module of the scheduler server, a second work item from the work list queue for the second application to select for performance by the second thread of the second application server. Determining the second work item comprises selecting a third set of work items in the work list queue for the second application by determining, for each respective work item in the work list queue for the second application indicated to have a pending status, whether assignment of the corresponding work request to the database server indicated for the respective work item would cause that database server to exceed a request threshold of that database server, and adding to the third set of work items each work item for which it was determined that assignment of the corresponding work request to the database server indicated for that work item would not cause that database server to exceed the request threshold of that database server. Determining the second work item further comprises selecting a target database server by, for each respective database server indicated for one of the third set of work items, calculating a current total weight value for the respective database server by summing indicated weight values for all work items of the work list queue for the second application that indicate assignment to that respective database server, and are indicated to have a processing status, and selecting the database server having the lowest calculated current total weight value. Determining the second work item further comprises selecting the second work item by determining, from the third set of work items, a fourth set of work items that has the selected target database server indicated, and selecting, from the fourth set of work items, the work item that has the highest indicated weight value as the second work item. In this feature of this aspect, the method further comprises communicating, from the scheduler module to the second application server, a communication instructing the second application server to execute the work request corresponding to the selected second work item utilizing the second thread of the second application server.

Another aspect relates to a method providing a technical solution to a technical problem of distributing non-transactional workload in the form of online analytical processing (OLAP) load across multiple database servers. The method includes receiving, at a scheduler server, a plurality of asynchronous work requests. The method further includes, at the scheduler server, for each respective received asynchronous work request, adding a respective corresponding work item to a work list queue, each respective corresponding work item including work request information from a payload of the corresponding work request, an indication of an application for the corresponding work request, an indication of a customer for the corresponding work request, an indication of a database server required for execution of the corresponding work request, an indication of a status of the respective work item, and an indication of a weight value representing a complexity of the corresponding work request. The method further includes receiving, at a scheduler module of the scheduler server, a message from a first application server for a first application indicating that a first thread of the first application server is ready for work. The method further includes determining, by the scheduler module of the scheduler server, a first work item from the work list queue to select for performance by the first thread of the first application server. Determining the first work item comprises selecting a first set of work items in the work list queue by determining, for each respective work item in the work list queue indicated to be associated with the first application and have a pending status, whether assignment of the corresponding work request to the database server indicated for the respective work item would cause that database server to exceed a request threshold of that database server, and adding to the first set of work items each work item for which it was determined that assignment of the corresponding work request to the database server indicated for that work item would not cause that database server to exceed the request threshold of that database server. Determining the first work item further comprises selecting a target database server by, for each respective database server indicated for one of the first set of work items, calculating a current total weight value for the respective database server by summing indicated weight values for all work items of the work list queue that indicate assignment to that respective database server, and are indicated to have a processing status, and selecting the database server having the lowest calculated current total weight value. Determining the first work item further comprises selecting the first work item by determining, from the first set of work items, a second set of work items that has the selected target database server indicated, and selecting, from the second set of work items, the work item that has the highest indicated weight value as the first work item. The method further comprises communicating, from the scheduler module to the first application server, a communication instructing the first application server to execute the work request corresponding to the selected first work item utilizing the first thread of the first application server.

In a feature of this aspect, the method further comprises receiving, at the scheduler module of the scheduler server, a message from a second application server for a second application indicating that a second thread of the second application server is ready for work, and determining, by the scheduler module of the scheduler server, a second work item from the work list queue to select for performance by the second thread of the second application server. Determining the second work item comprises selecting a third set of work items in the work list queue by determining, for each respective work item in the work list queue indicated to be associated with the second application and have a pending status, whether assignment of the corresponding work request to the database server indicated for the respective work item would cause that database server to exceed a request threshold of that database server, and adding to the third set of work items each work item for which it was determined that assignment of the corresponding work request to the database server indicated for that work item would not cause that database server to exceed the request threshold of that database server. Determining the second work item further comprises selecting a target database server by, for each respective database server indicated for one of the third set of work items, calculating a current total weight value for the respective database server by summing indicated weight values for all work items of the work list queue that indicate assignment to that respective database server, and are indicated to have a processing status, and selecting the database server having the lowest calculated current total weight value. Determining the second work item further comprises selecting the second work item by determining, from the third set of work items, a fourth set of work items that has the selected target database server indicated, and selecting, from the fourth set of work items, the work item that has the highest indicated weight value as the second work item. In this feature of this aspect, the method further comprises communicating, from the scheduler module to the second application server, a communication instructing the second application server to execute the work request corresponding to the selected second work item utilizing the first thread of the second application server.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

FIG. 37 illustrates an exemplary dequeue algorithm in accordance with one or more preferred implementations.

DETAILED DESCRIPTION

Figure 1:
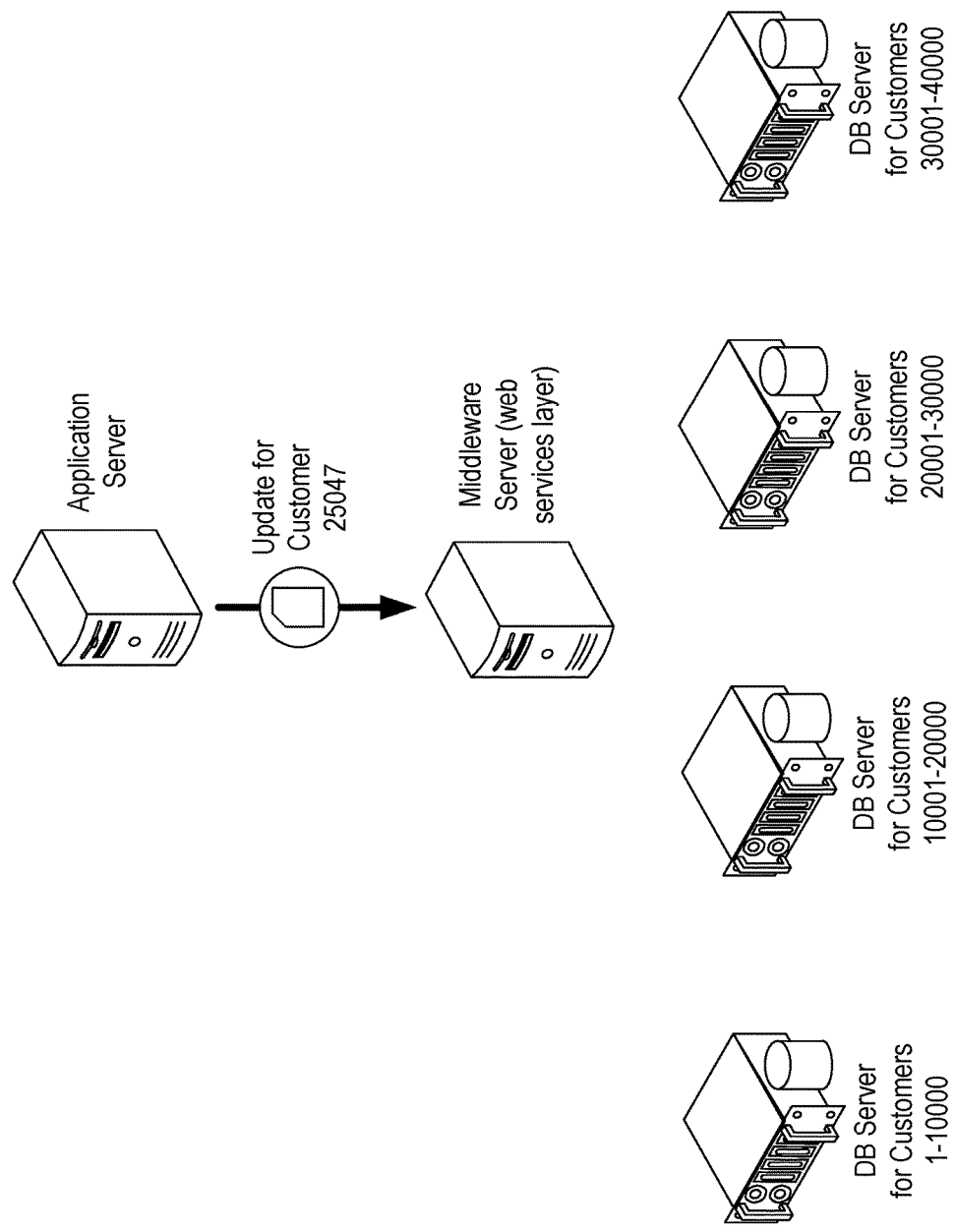
FIGS. 1-2 illustrate an exemplary conventional system implementing a data-dependent routing data warehouse approach.
Figure 2:
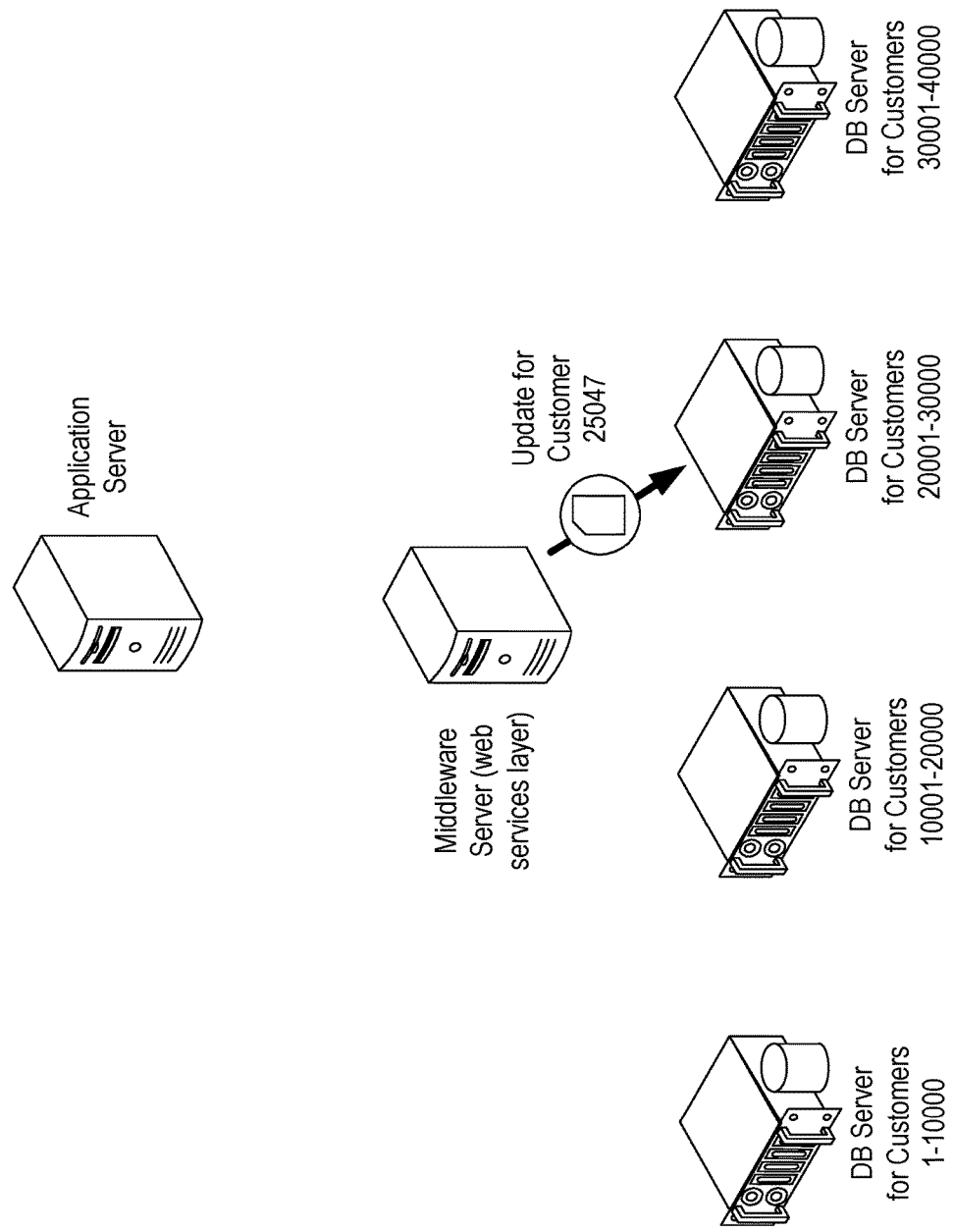
Figure 3:
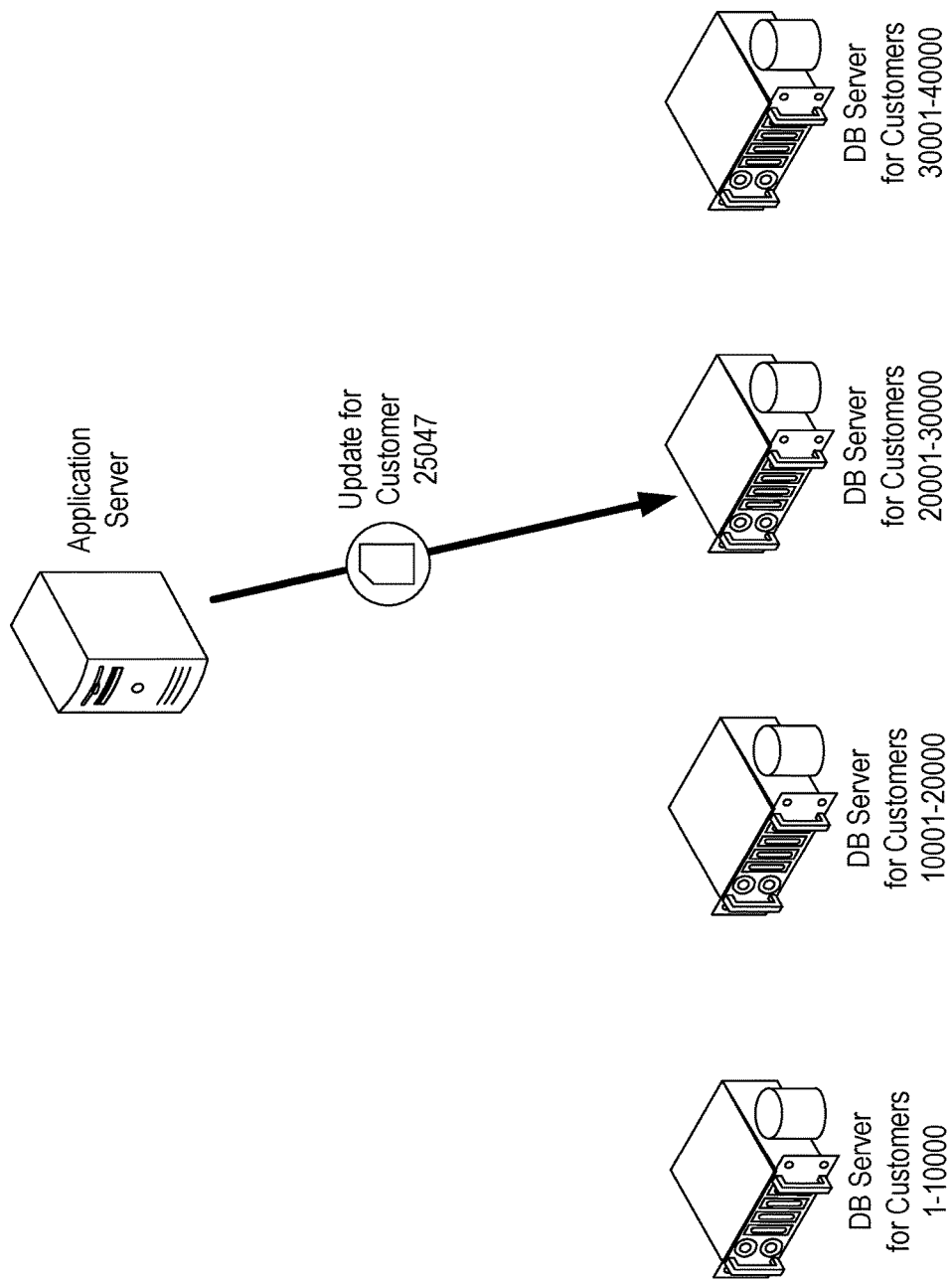
FIG. 3-4 illustrate a conventional data warehouse approach in which external applications are responsible for querying database servers directly.
Figure 4:
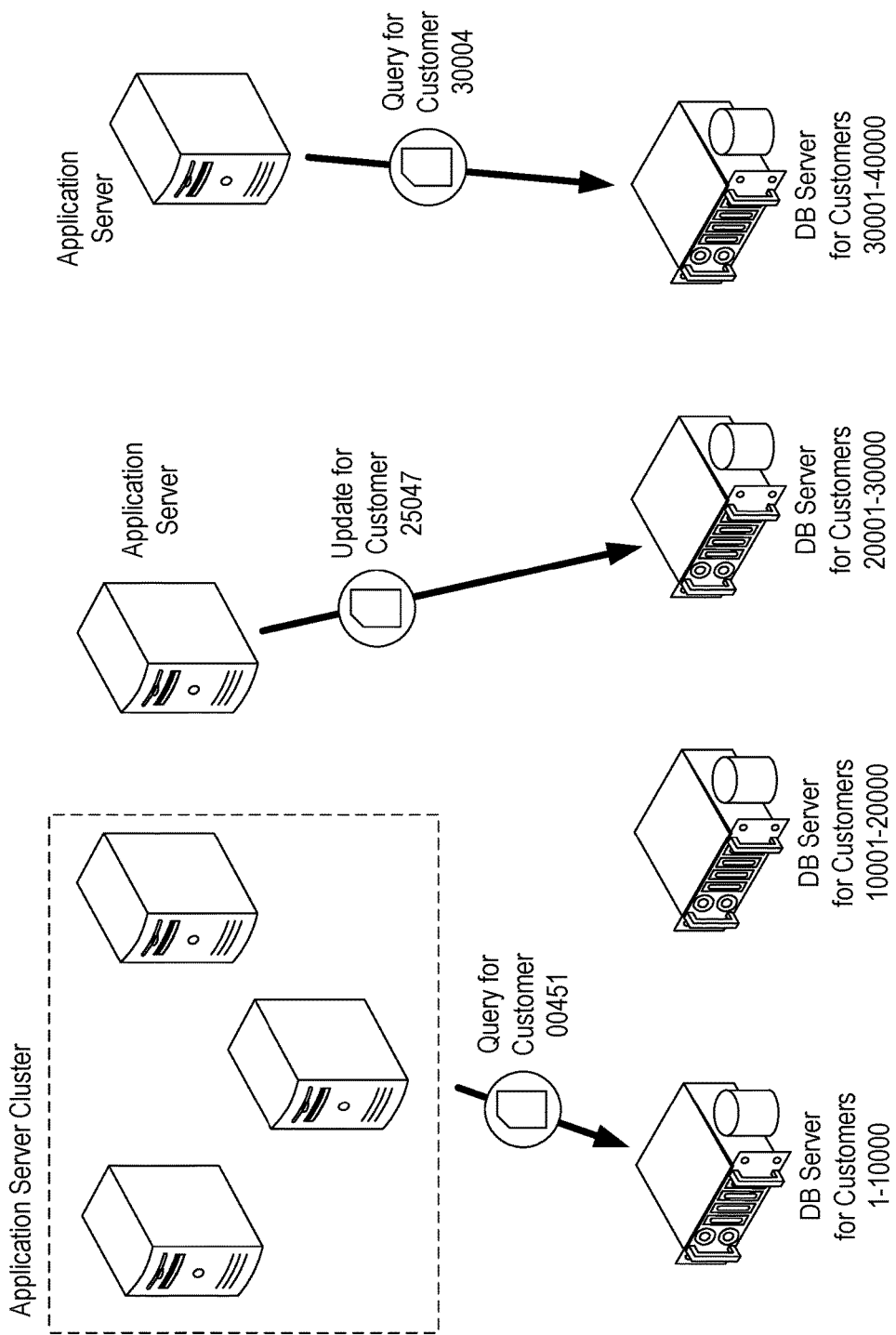
Figure 5:
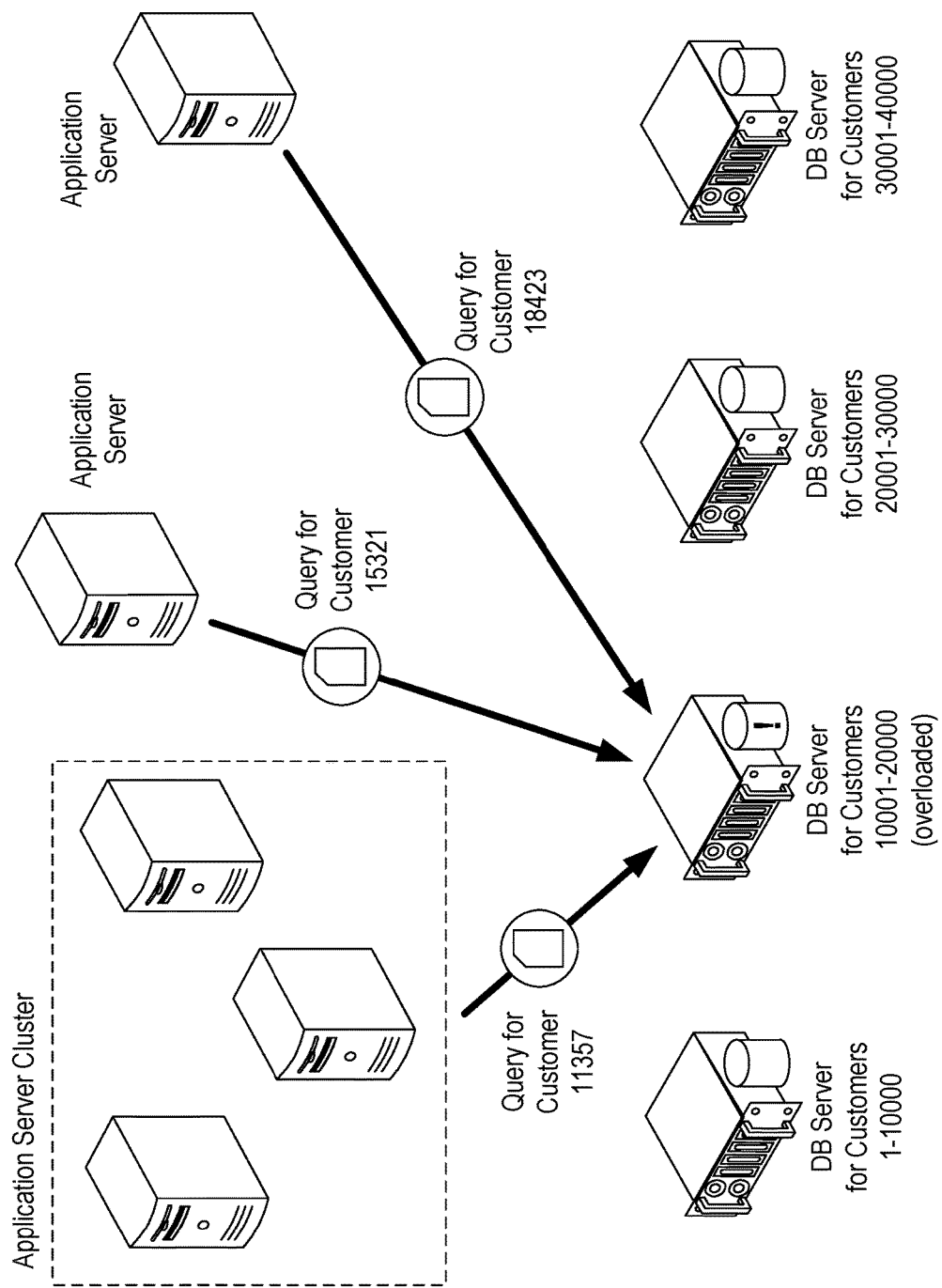
FIG. 5 illustrates overloading of a database server based on requests from different applications.
Figure 6:
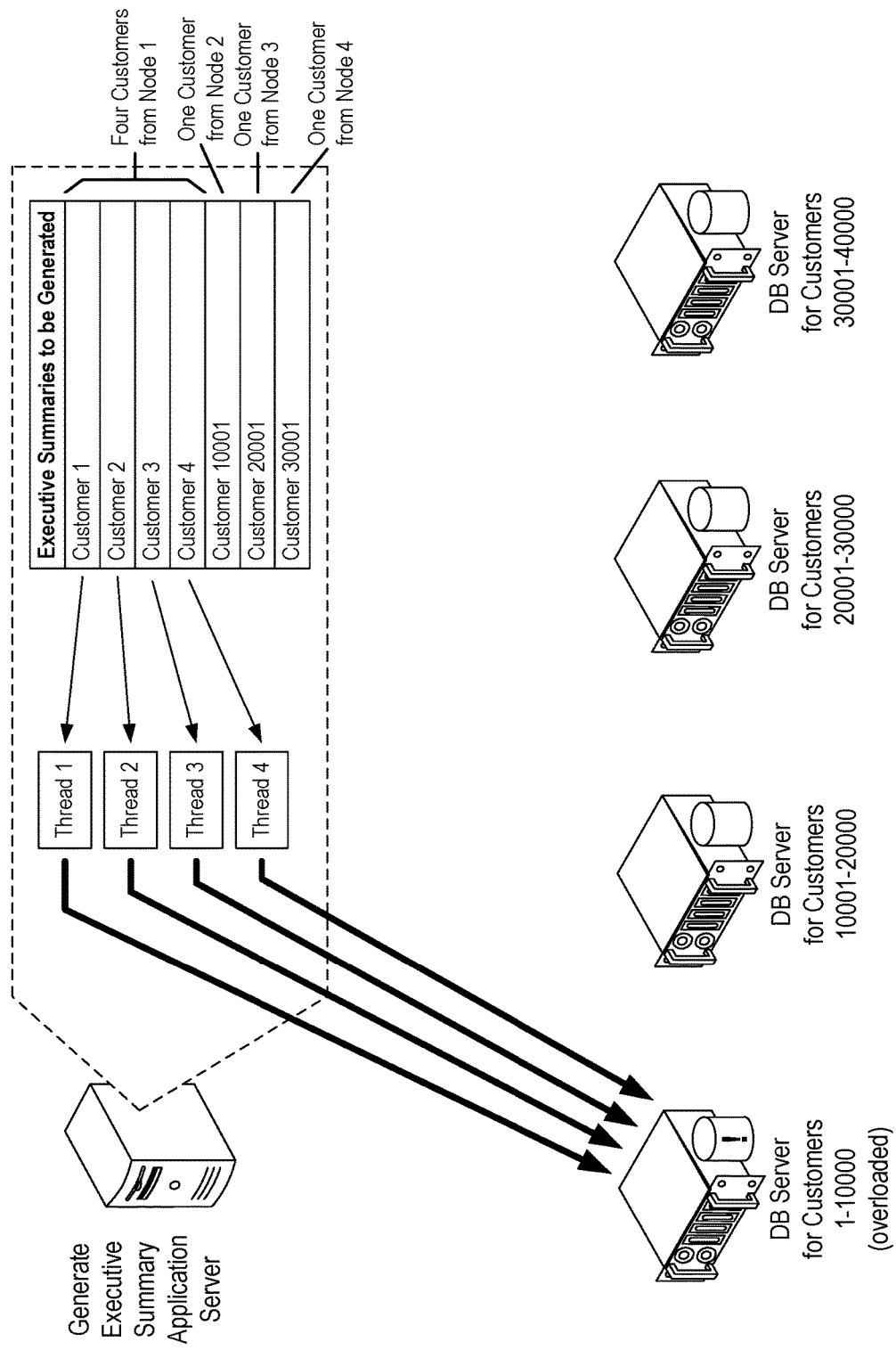
FIG. 6 illustrates overloading of a database server based on requests from different threads for the same application.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one", but does not exclude a plurality unless the contextual use dictates otherwise. Thus, reference to "a picnic basket having an apple" describes "a picnic basket having at least one apple" as well as "a picnic basket having apples". In contrast, reference to "a picnic basket having a single apple" describes "a picnic basket having only one apple".

When used herein to join a list of items, "or" denotes "at least one of the items", but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers". When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese".

Referring now to the drawings, one or more preferred embodiments of the invention are next described. The following description of one or more preferred embodiments is merely exemplary in nature and is in no way intended to limit the invention, its implementations, or uses.

Figure 7:
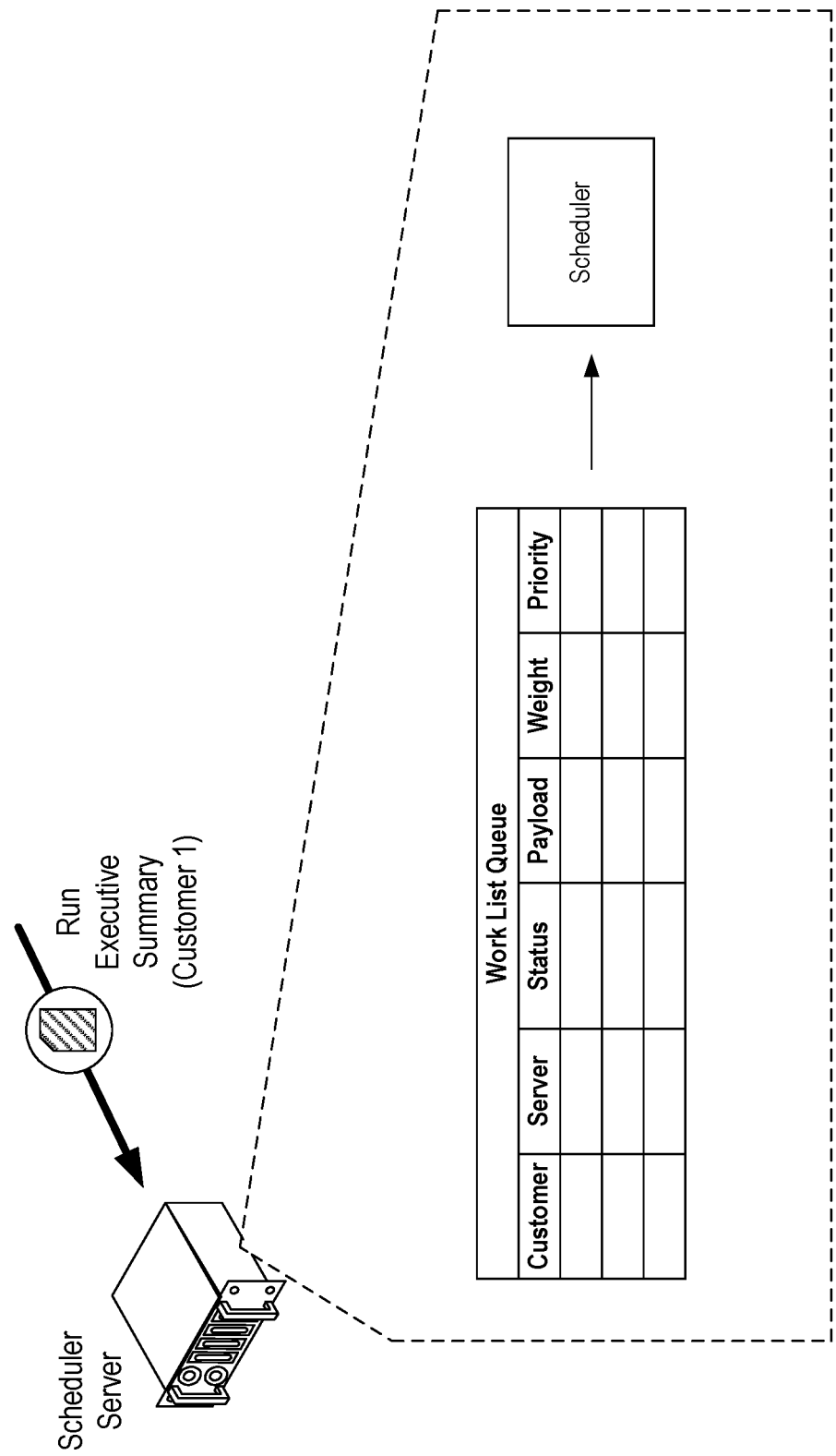
FIG. 7 illustrates components of an exemplary system in accordance with one or more preferred implementations.
Figure 8:
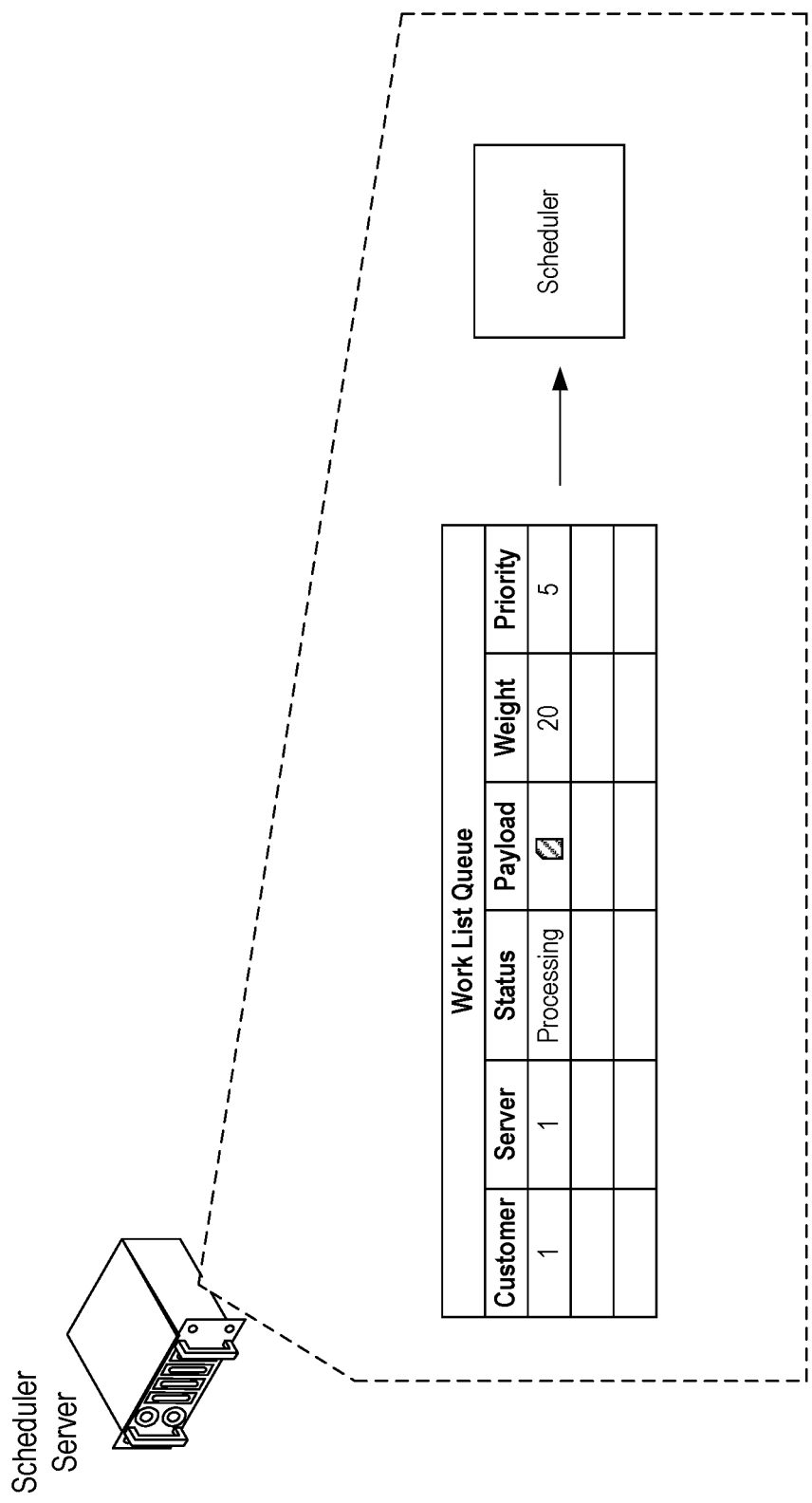
FIG. 8 illustrates addition of a work item to a work list queue.

FIG. 7 illustrates components of an exemplary system in accordance with one or more preferred implementations. The system includes a scheduler server which is configured to receive work requests and based thereon add a corresponding work item to a work list queue, as illustrated in FIGS. 7-8. The scheduler server includes a scheduler module which accesses work items from the work list queue and determines how to assign the work for execution.

The system is configured for use with asynchronous work requests, where the answer to the work request will not be immediately available, and the requester will be notified of the results by a separate mechanism. Received work requests include a payload, which represents a request for work. The payload may contain different information depending on the application which the work request is for. The payload will be used by the application to determine the nature of the request, and may include, for example, input parameters for a report such as a date range. Preferably, the corresponding work item for a work request message includes this work request payload or an indication thereof.

Figure 9:
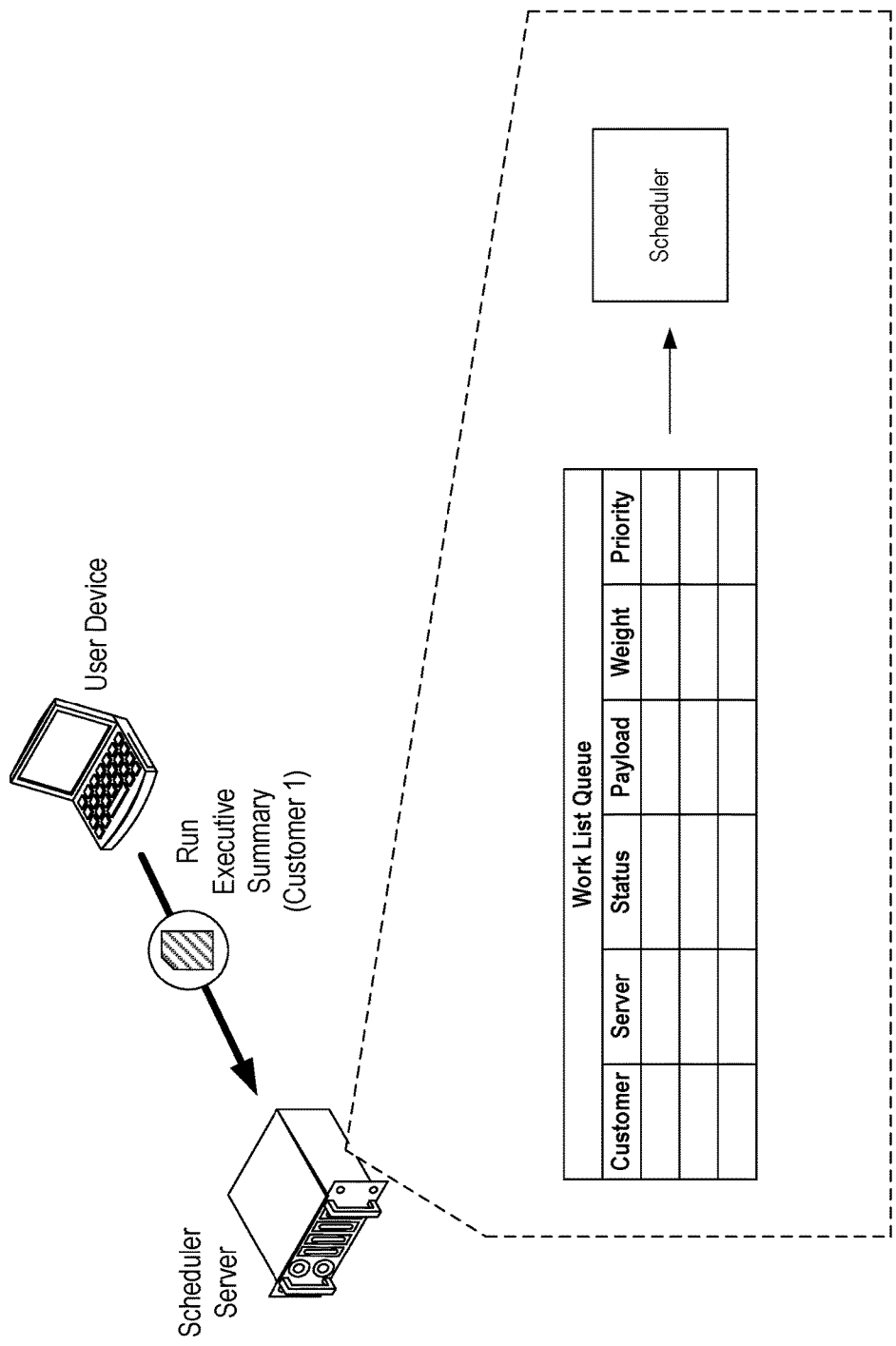
FIG. 9 illustrates receipt of a work request from a user device.
Figure 10:
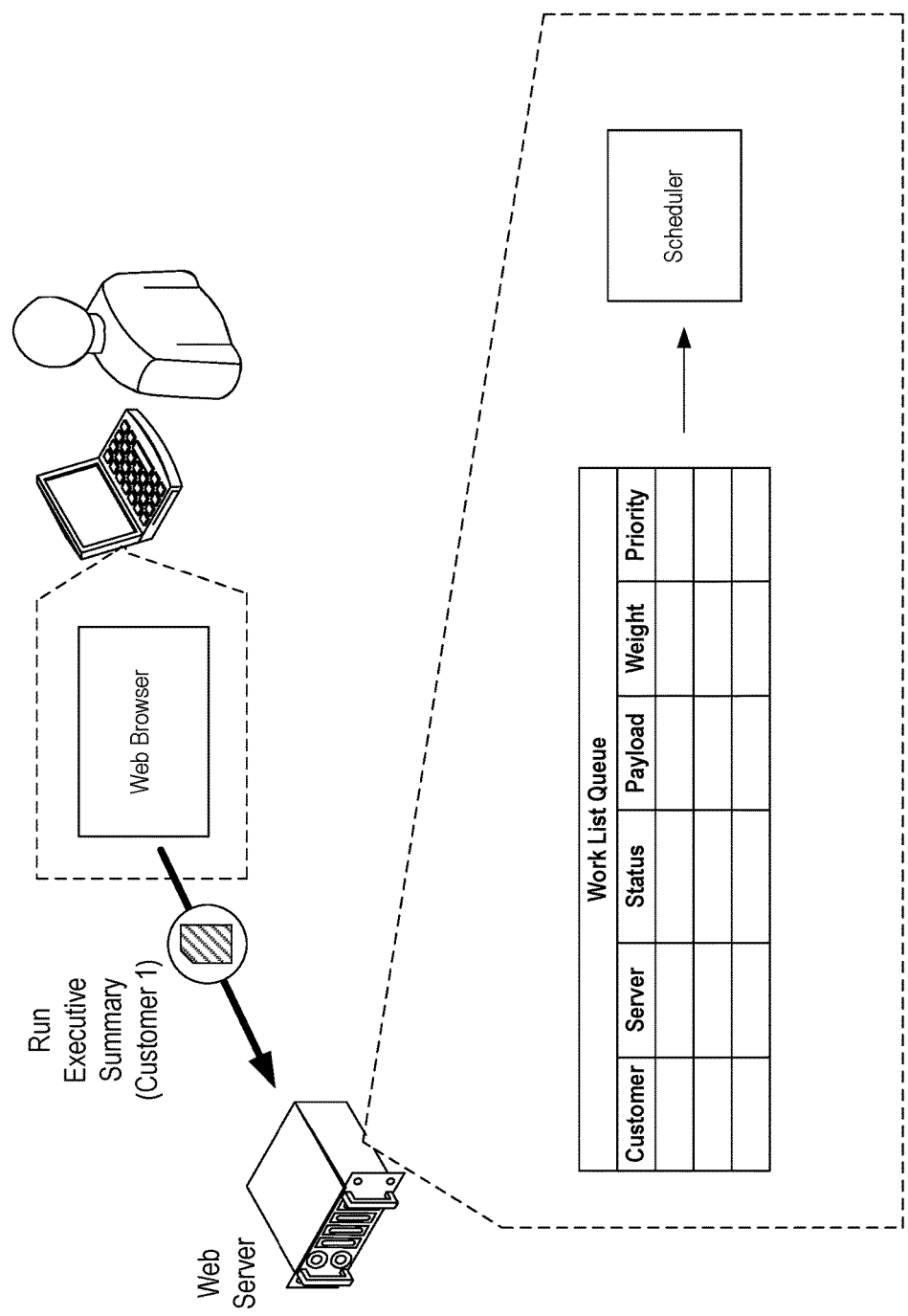
FIG. 10 illustrates receipt of a work request representing a user request from a web site.
Figure 11:
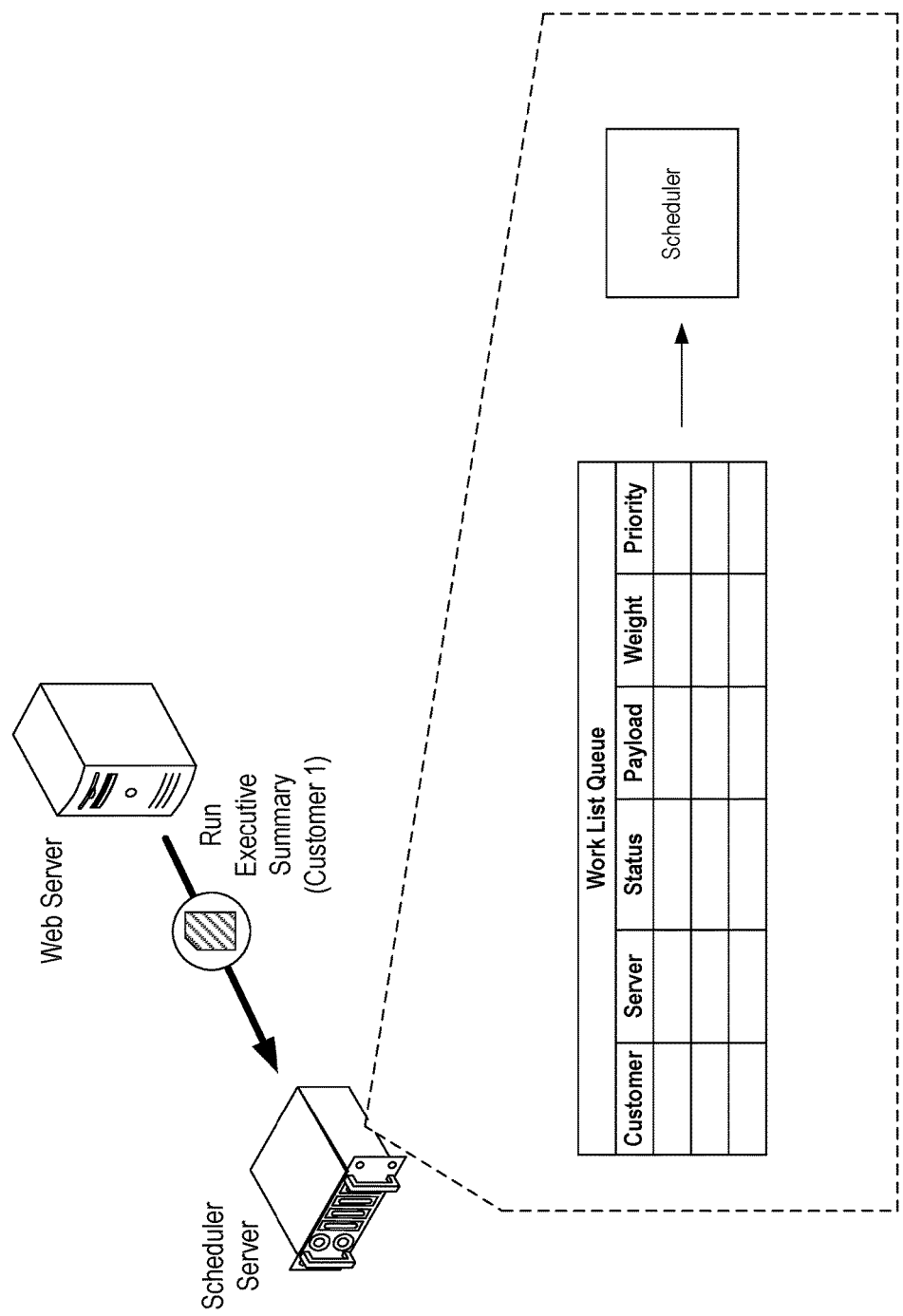
FIG. 11 illustrates receipt of a work request from a web server.
Figure 12:
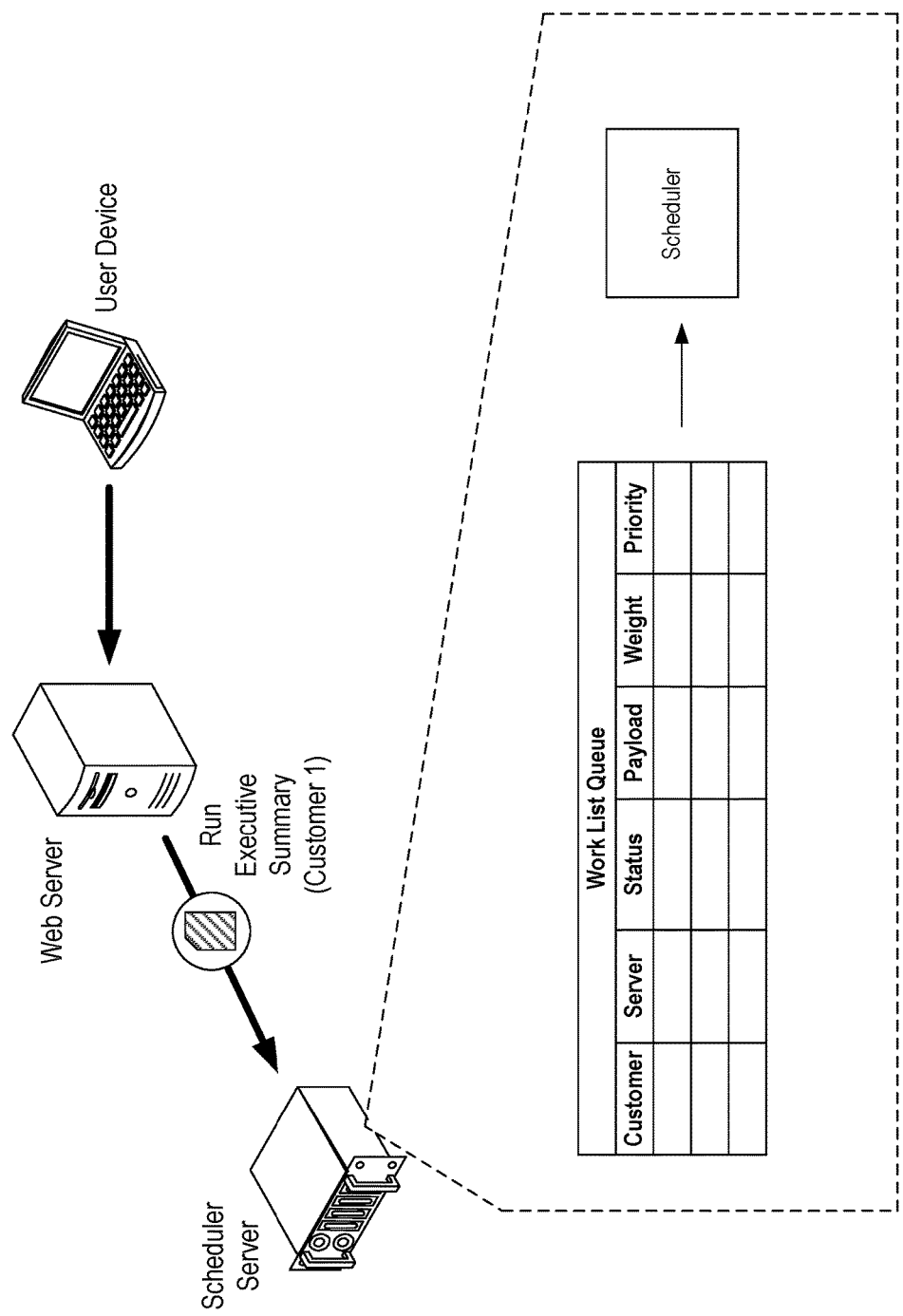
FIG. 12 illustrates receipt of a work request from a web server based on a user request.

In accordance with one or more preferred implementations, a scheduler server can receive work requests based on a timer based job, a user request from a web site, or some other mechanism. FIG. 9 illustrates an example where a scheduler server receives a work request from a user device. In accordance with one or more preferred implementations, a scheduler server may be a web server, and a work request may be received, for example, as a user request from a web site, as illustrated in FIG. 10. Additionally, a scheduler server may receive a work request from a web server, as illustrated in FIG. 11. This web server may send the work request based on a user request via a web site or web API, as illustrated in FIG. 12.

Figure 13:
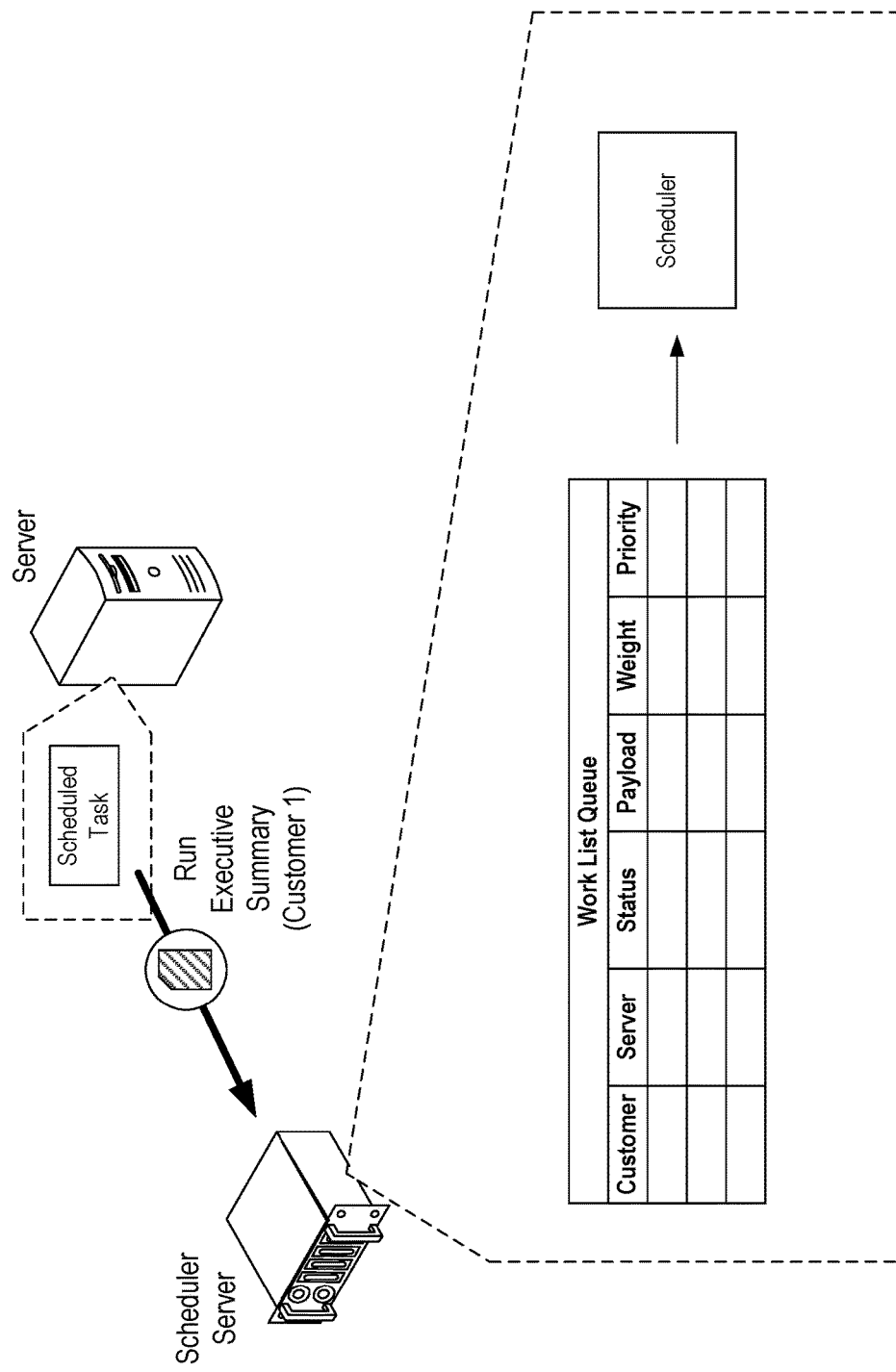
FIG. 13 illustrates addition of a work item to a work queue list based on a scheduled task.
Figure 14:
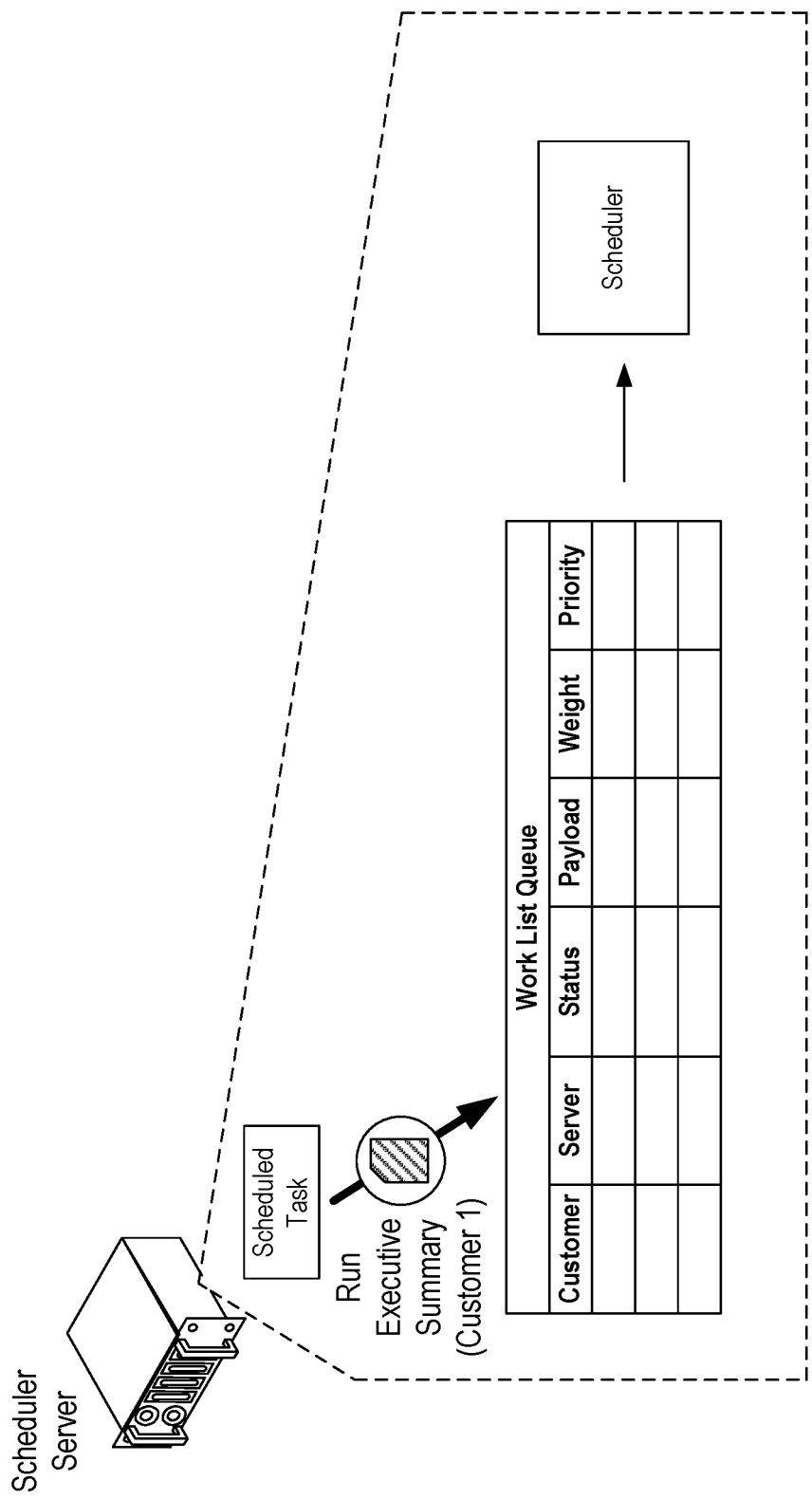
FIG. 14 illustrates addition of a work item to a work queue list based on a scheduled task at a scheduler server.

In accordance with one or more preferred implementations, a scheduler server receives a work request based on a scheduled task at a local or remote server, as illustrated in FIG. 13. In accordance with one or more preferred implementations, a scheduler server actually adds a work item to its work list queue based on a scheduled task at the scheduler server, as illustrated in FIG. 14.

Figure 15:
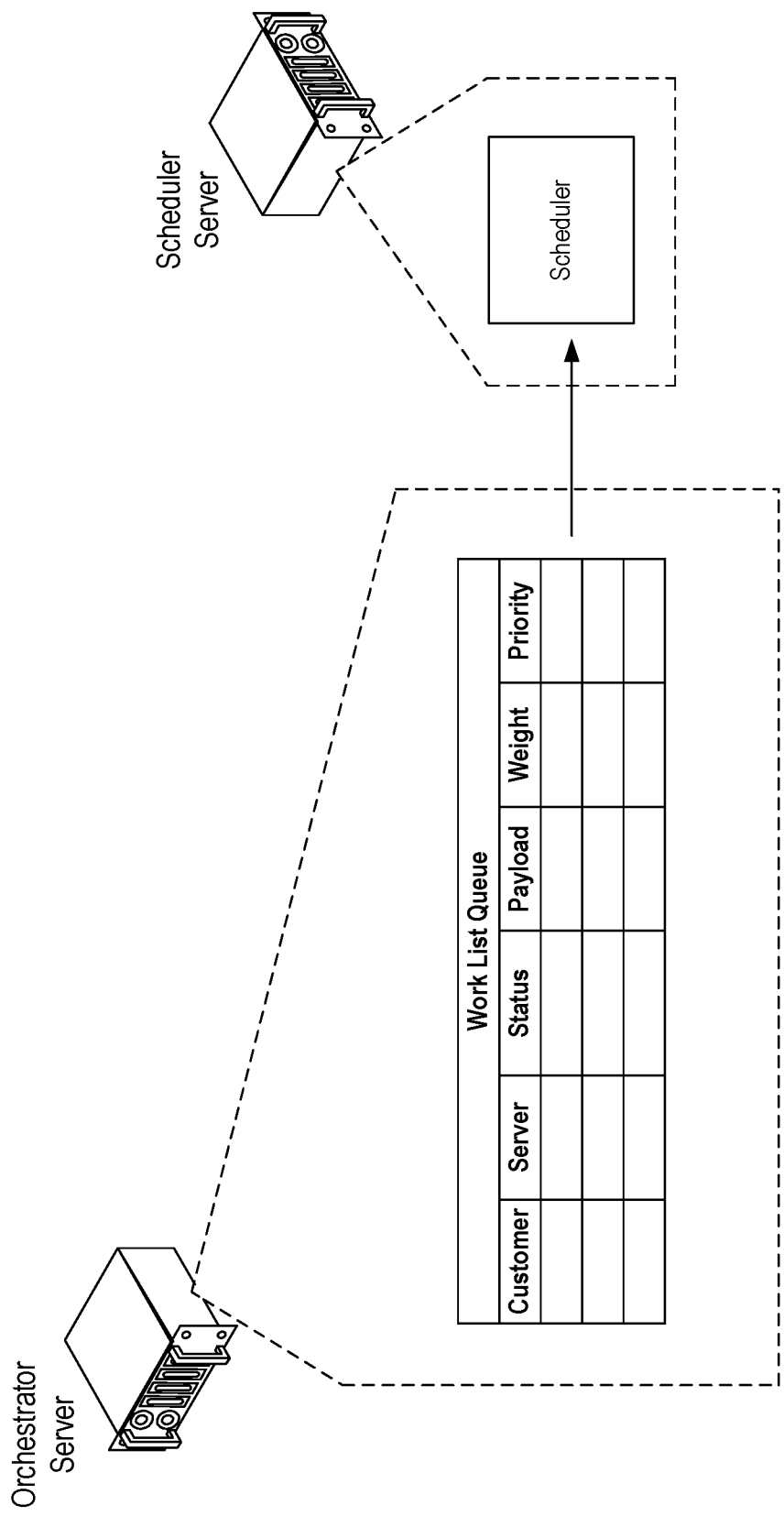
FIG. 15 illustrates a system which includes an orchestrator server and a scheduler server.

FIG. 7 illustrates an exemplary system in which a scheduler server includes a work list queue and a scheduler module. In accordance with one or more preferred implementations, a work list queue is part of an orchestrator server which is configured to receive work requests, and a separate scheduler server includes a scheduler module, as illustrated in FIG. 15.

Figure 16:
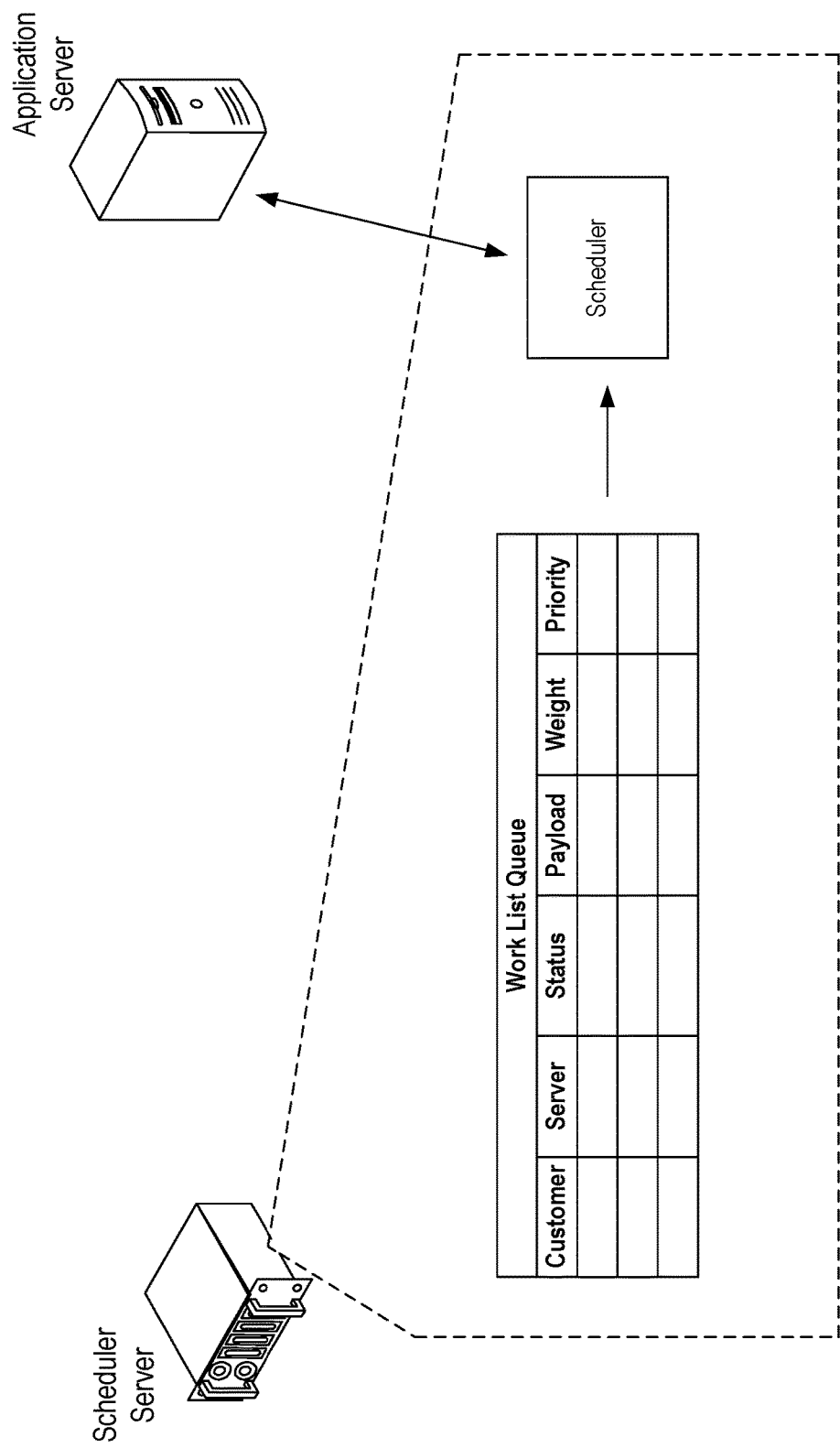
FIGS. 16-19D illustrate systems including one or more application servers configured to carry out work requests.
Figure 17:
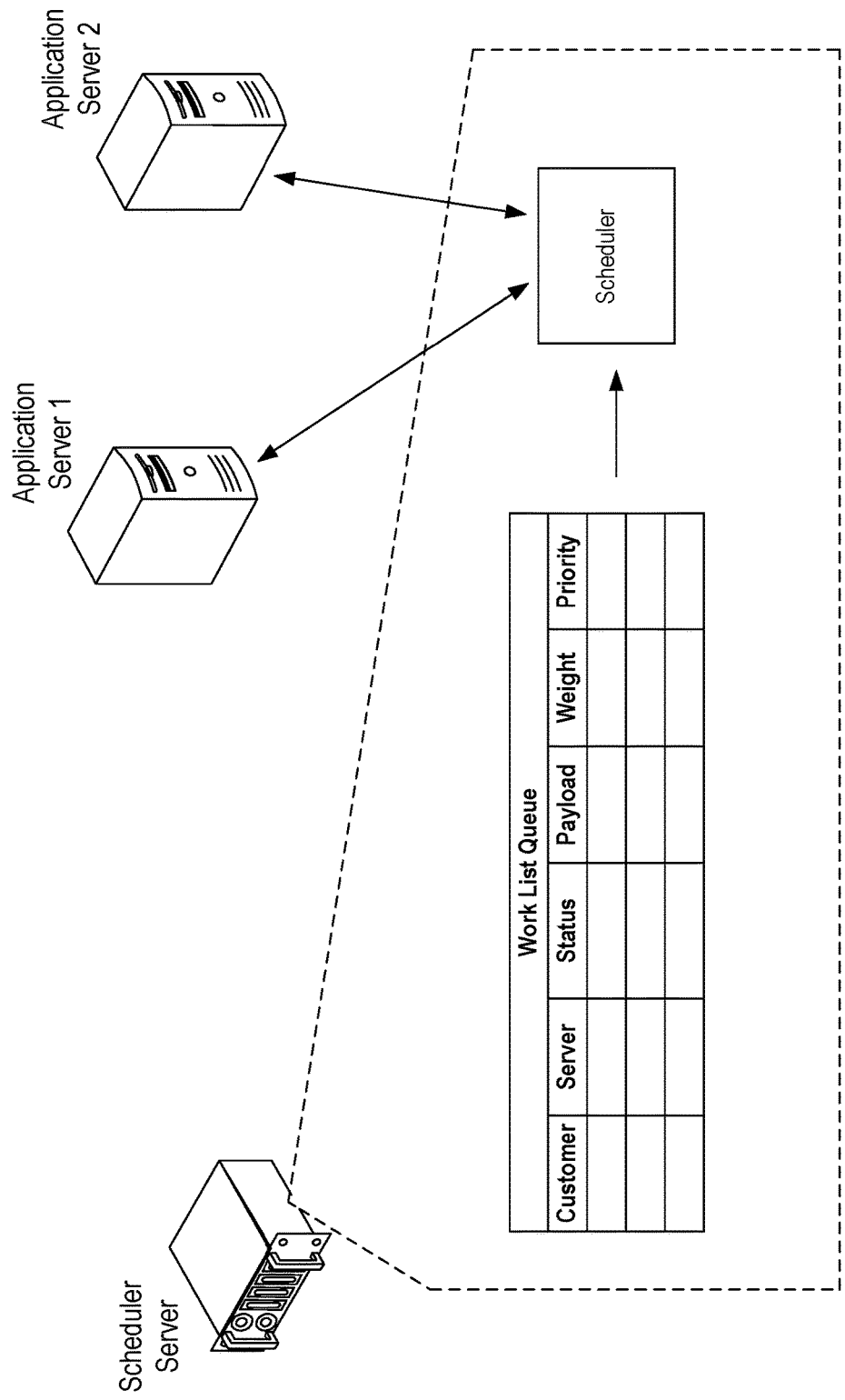
Figure 18:
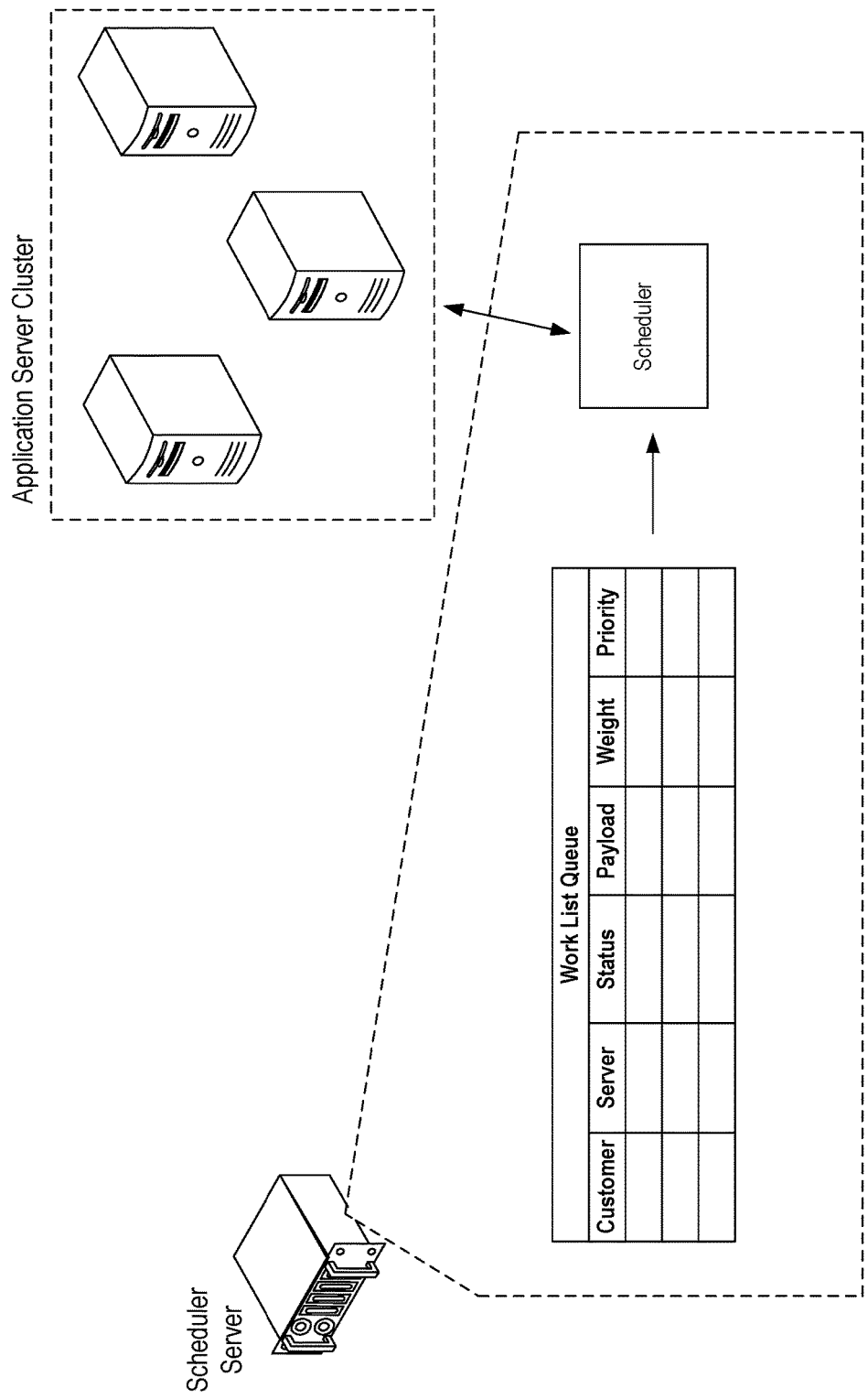

An exemplary system in accordance with one or more preferred implementations preferably further includes one or more application servers configured to carry out work requests, as illustrated in FIG. 16. A system may include multiple application servers for the same application (as illustrated in FIG. 17), or even an application server cluster for an application (as illustrated in FIG. 18). Further, a system may include application servers for different applications (as illustrated in FIGS. 19A-D). Although illustrated and described herein in the context of application servers configured to carry out work for a single application, in accordance with one or more preferred implementation a single application server may even be configured to carry out work for multiple, different applications.

Figure 19A:
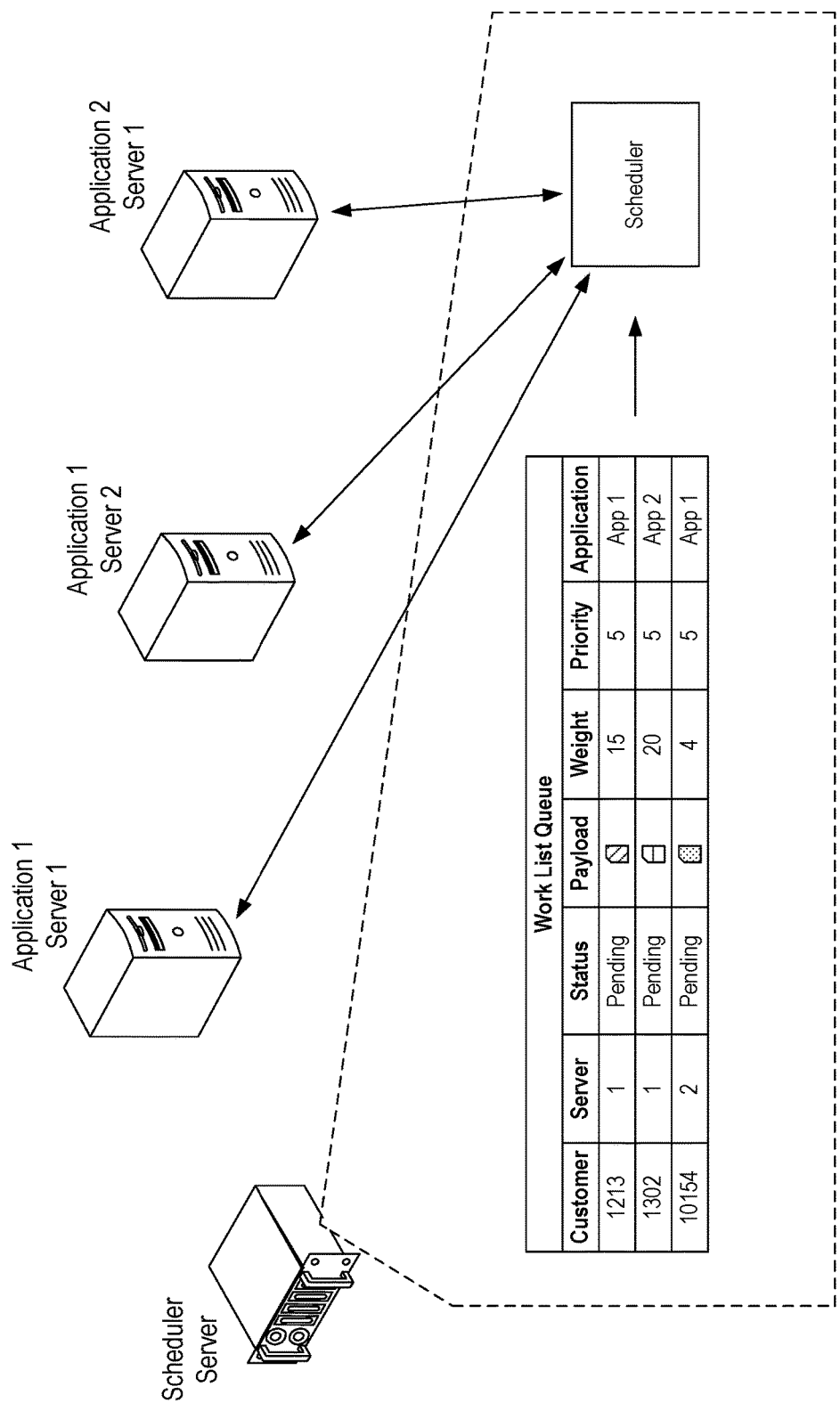

In accordance with one or more preferred implementations, a work list queue includes an indication of an application associated with a work request, as illustrated in FIG. 19A. In accordance with one or more preferred implementations, such an indication is contained in the payload of a work request. In accordance with one or more preferred implementations, information from a payload of a work request is utilized to populate the work list queue.

Figure 19B:
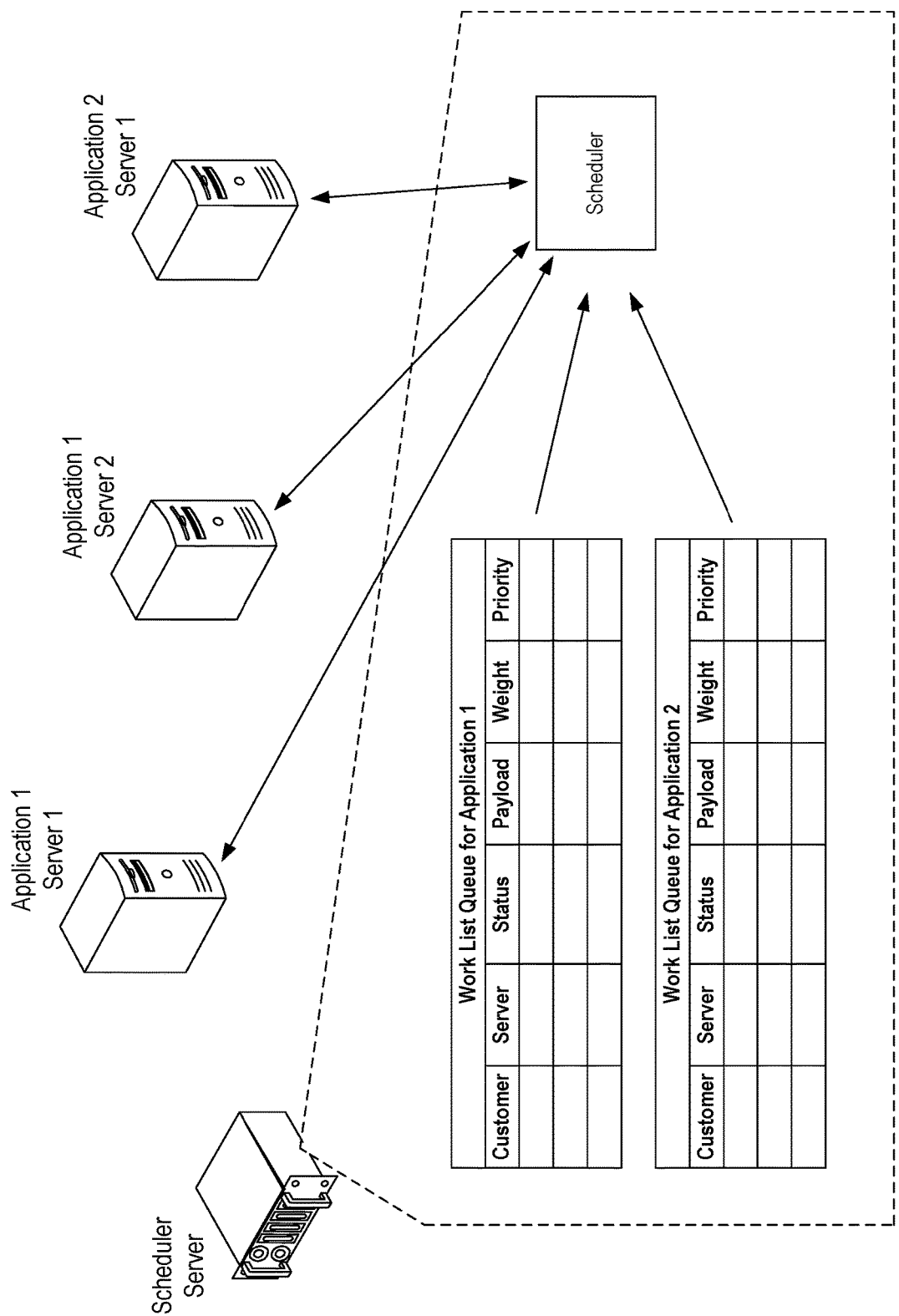
Figure 19C:
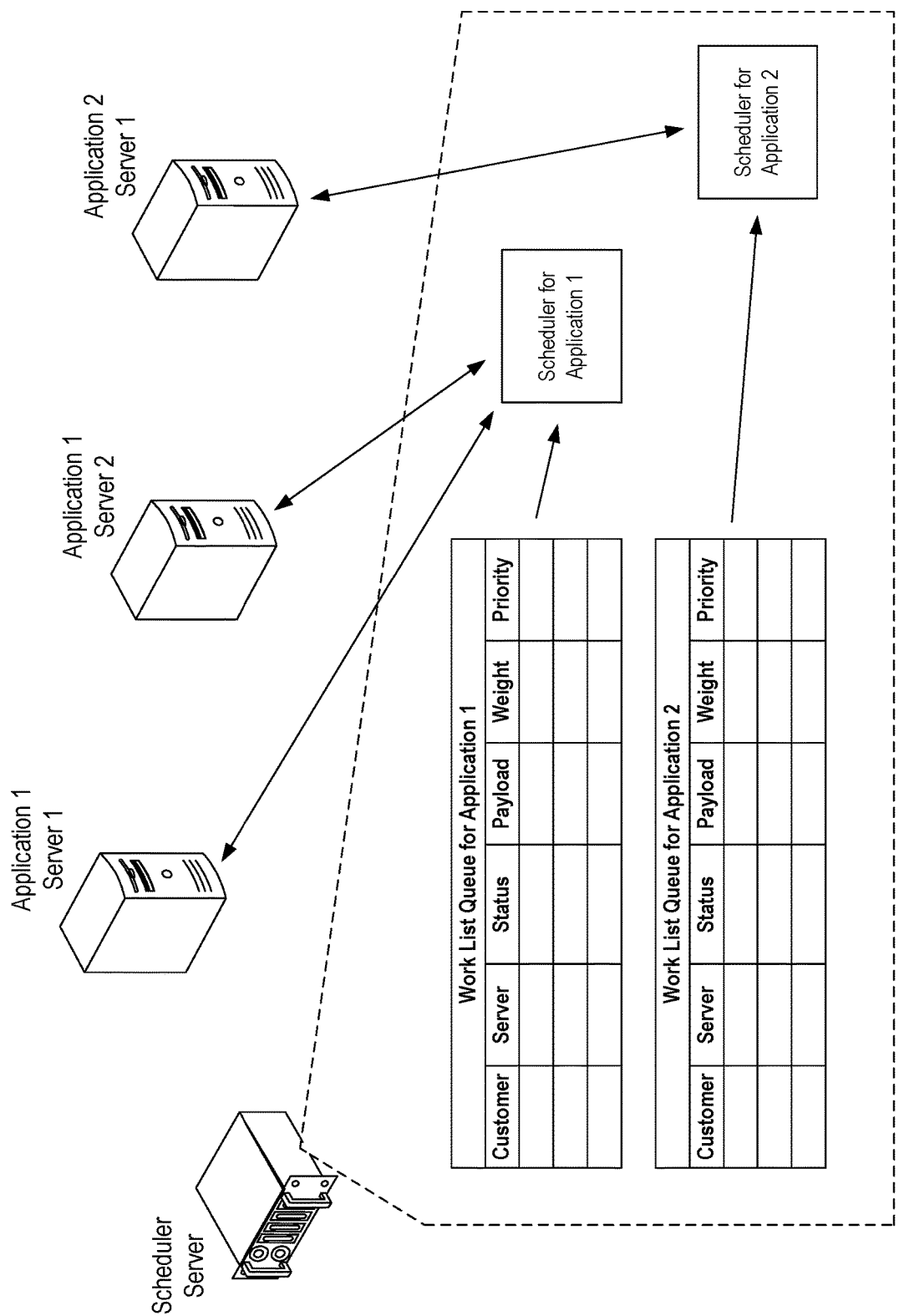
Figure 19D:
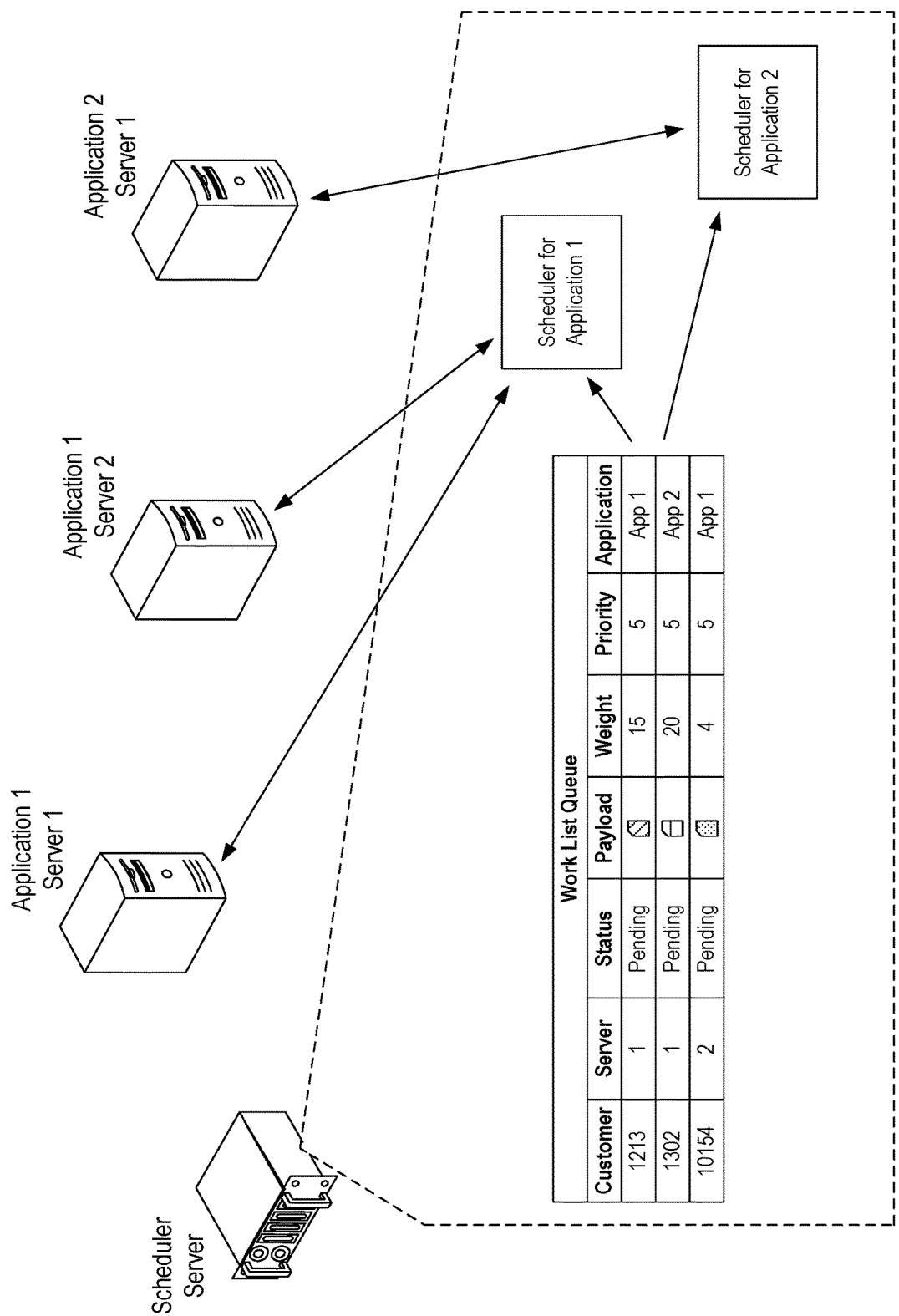

In accordance with one or more preferred implementations, a single work list queue and scheduler module are utilized to assign work to application servers for multiple applications, as illustrated in FIG. 19A. In accordance with one or more preferred implementations, a work list queue may be utilized for each application for which work is to be assigned, as illustrated in FIG. 19B. In accordance with one or more preferred implementations, multiple instances of a scheduler module may be utilized, with each instance being associated with an application for which work is to be assigned, as illustrated in FIG. 19C. In accordance with one or more preferred implementations, a single work list queue may be used with multiple instances of a scheduler module, as illustrated in FIG. 19D.

In accordance with one or more preferred implementations, an application programming interface (API) may be provided for submitting a work request. In accordance with one or more preferred implementations, work requests may be received as work request messages.

Figure 20:
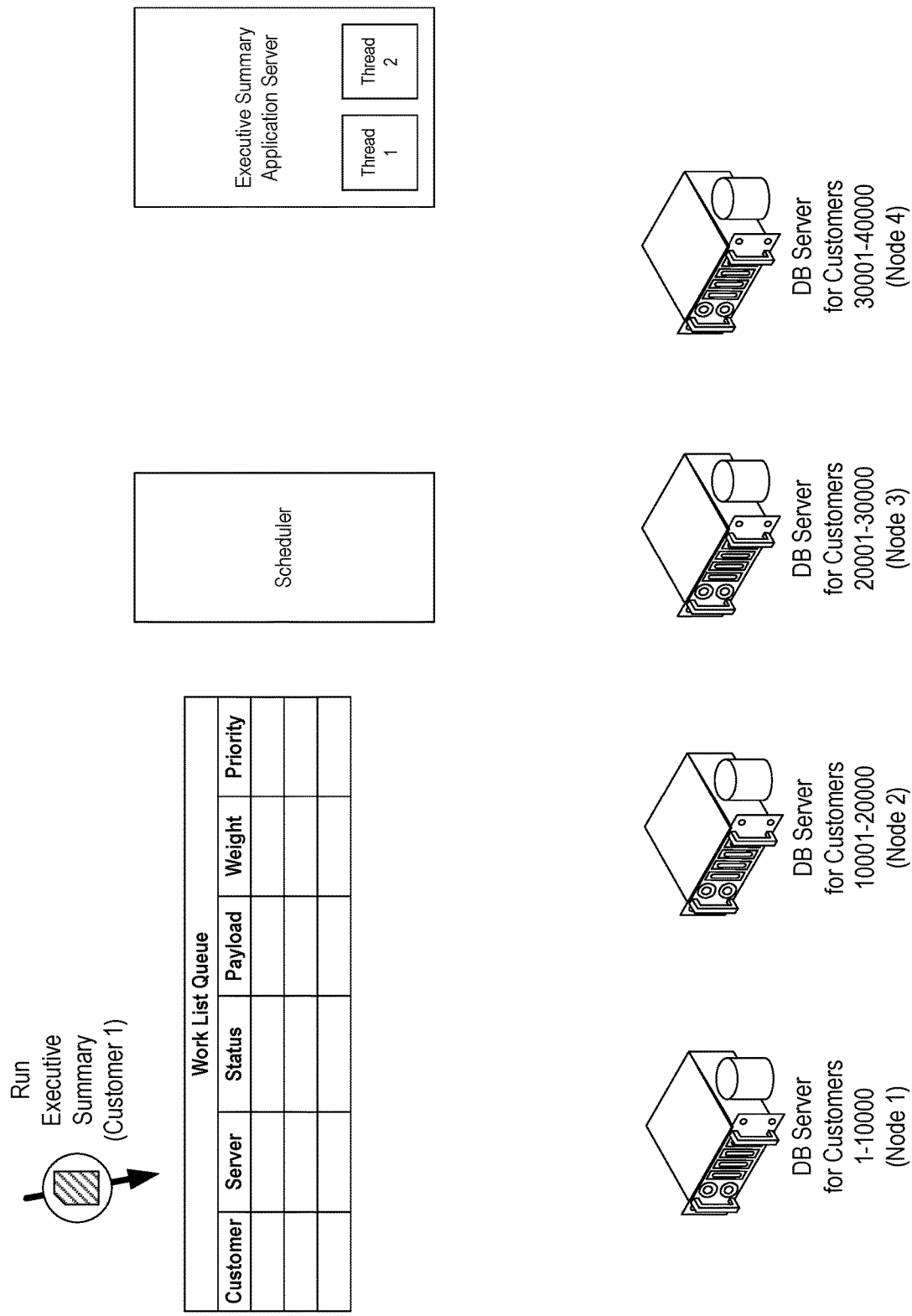
FIGS. 20-22 illustrate addition of work items to a work list queue based on received work requests.
Figure 21:
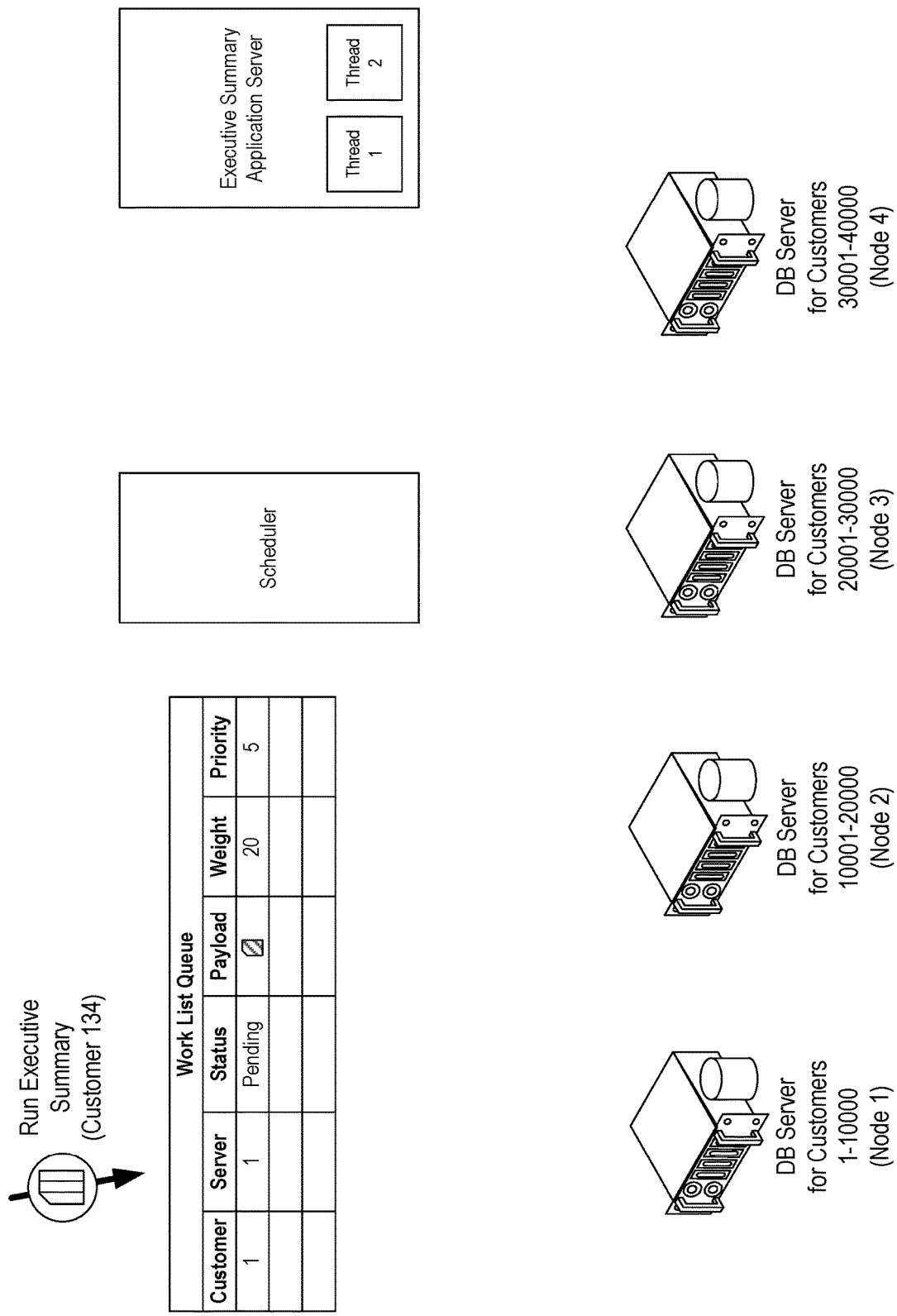
Figure 22:
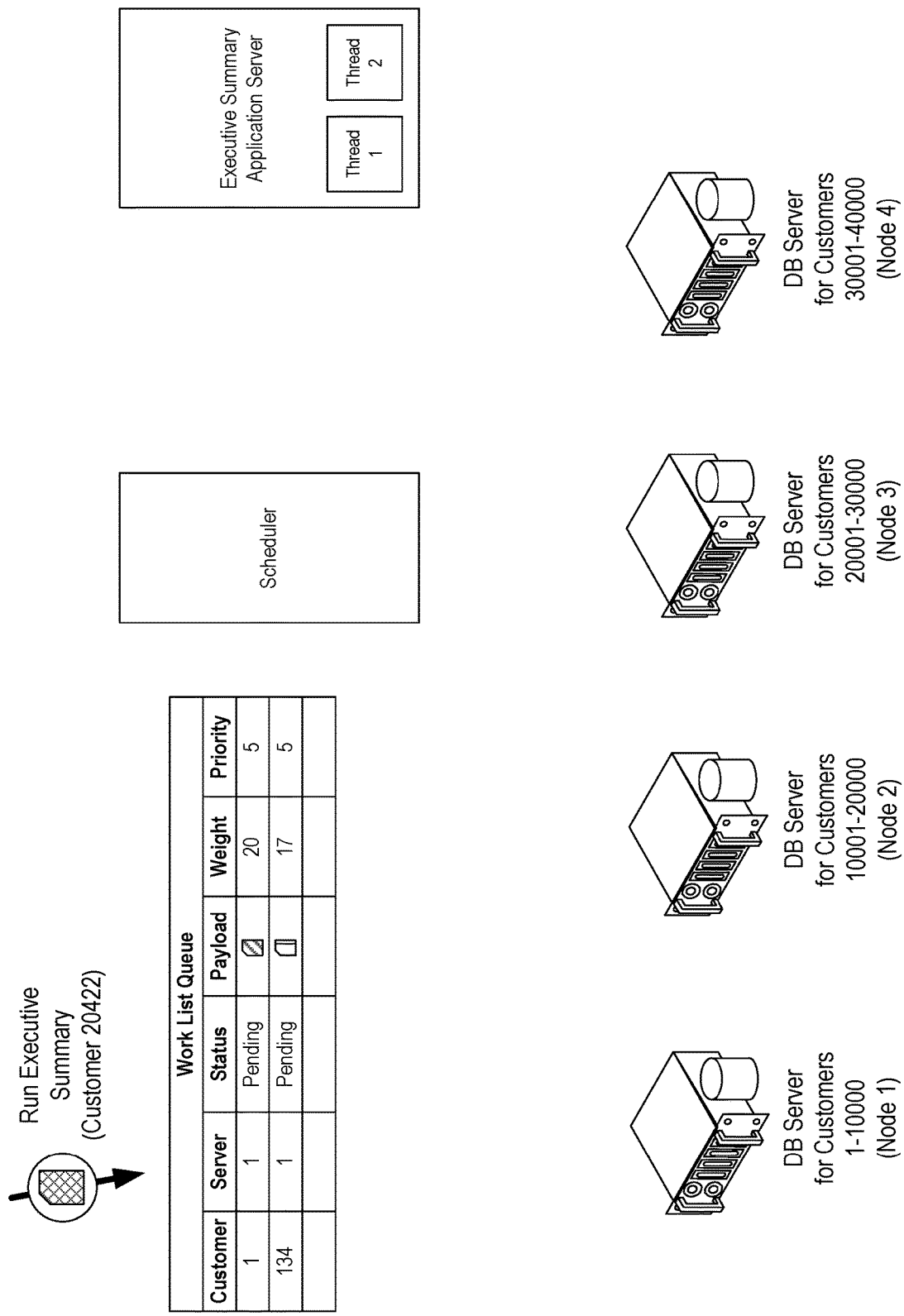

FIG. 20 illustrates receipt of a first work request which results in adding of a corresponding first work item to the work list queue (as can be seen in FIG. 21). FIG. 21 illustrates receipt of a second work request which results in adding of a corresponding second work item to the work list queue (as can be seen in FIG. 22). FIG. 22 illustrates receipt of a third work request which results in adding of a corresponding third work item to the work list queue (as can be seen in FIG. 22).

As noted above, in accordance with one or more preferred implementations, a scheduler module accesses work items from a work list queue and determines how to assign the work for execution. In accordance with one or more preferred implementations, a scheduler module is responsible for distributing load evenly across database servers by taking off work items from the worklist queue in an intelligent order. Preferably, a scheduler module is configured to assign work to one or more application servers. In accordance with one or more preferred implementations, a pull model is utilized in which an application server informs a scheduler module that it is ready to receive work, and based thereon a scheduler module sends work to the application server. In accordance with one or more preferred implementations, a push model is utilized in which a scheduler module pushes work to an application server. In accordance with one or more preferred implementations utilizing a push model, a scheduler is configured to know how many resources (e.g. threads or workers) are available to the application server to avoid pushing too much work to the application server.

Figure 23:
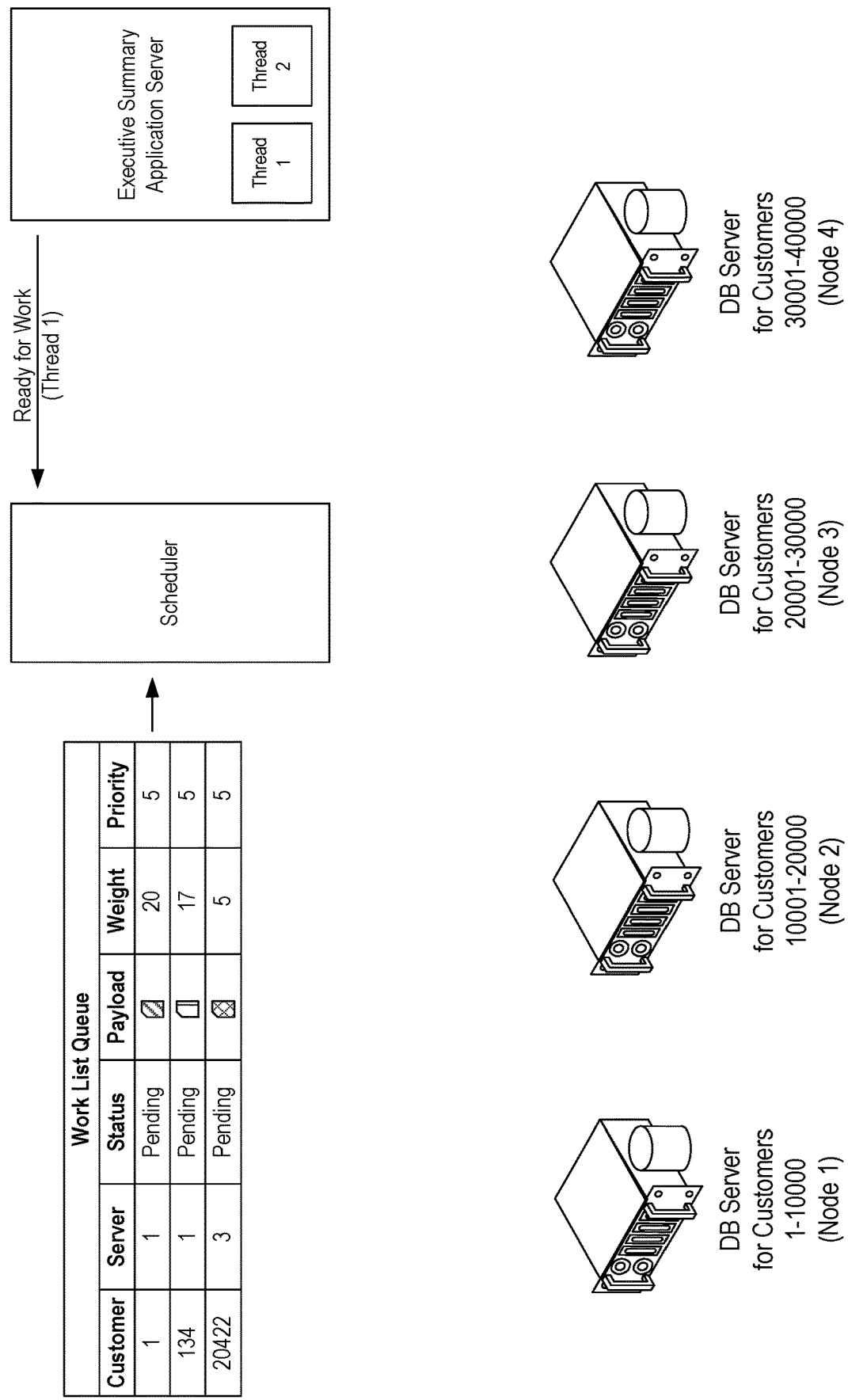
FIG. 23 illustrates communication to a scheduler module of an indication that a thread of an application server is ready for work.

In the illustrated example of FIG. 23, a pull model is utilized, and the executive summary application server communicates a message to the scheduler module informing the scheduler module that thread 1 of the executive summary application server is ready for work. In response, the scheduler module accesses the work list queue and determines a work item from the work list queue to send to the executive summary application server for execution by thread 1.

In accordance with various preferred implementations, different algorithms are utilized for selection of a work item from the work list queue.

In accordance with one or more preferred implementations, work items in the work list queue are weighted based on a complexity level (e.g. an estimated amount of time/resources required to perform the work). A weight value for a work request might be provided with the work request, might be pre-calculated for a particular request type, or might even be based on a real-time analysis of the work request.

In accordance with one or more preferred implementations, a scheduler module is configured to prioritize requests with a higher weight. In the illustrated simple example of FIG. 24, the scheduler module determines that the first work item in the work list queue has the highest weight, and communicates a message to the application server including an indication of the corresponding work request of running an executive summary for customer 1.

In accordance with one or more preferred implementations, this message is communicated to thread 1, or is communicated with an indication that it is for execution by thread 1. In accordance with one or more preferred implementations, it may simply be communicated and the application server may decide to assign it to thread 1. In accordance with one or more preferred implementations, a confirmation may be sent to the scheduler module so that it knows that thread 1 is performing the work. In accordance with one or more preferred implementations, such a confirmation may not be sent.

Figure 24:
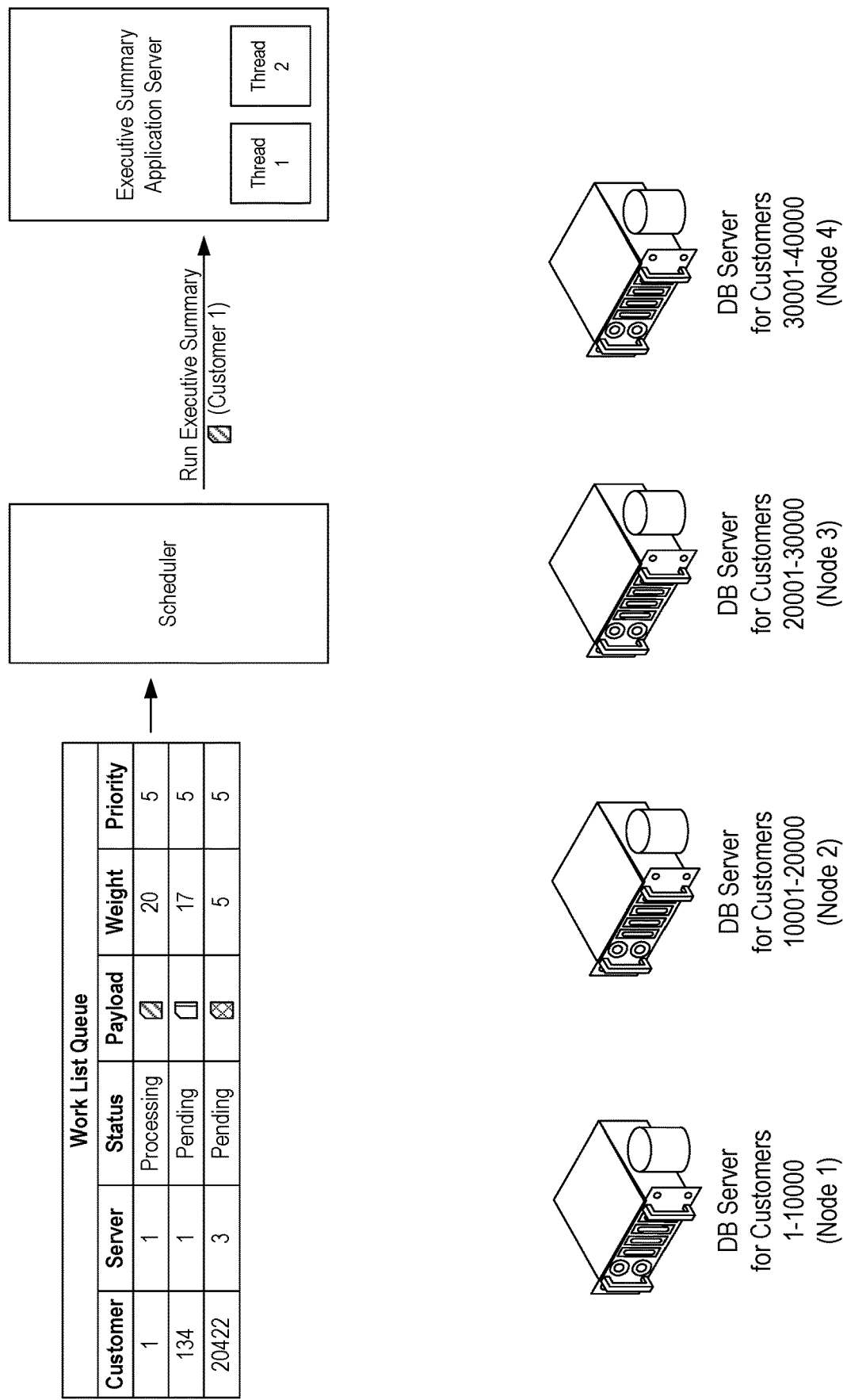
FIG. 24 illustrates communication of work from a scheduler module to an application server.

In accordance with one or more preferred implementations, upon communication of a message including an indication of the corresponding work request of running an executive summary for customer 1, or upon receipt of a confirmation that the work is being performed, a status of the corresponding work item is updated to "Processing", as illustrated in FIG. 24.

Figure 25:
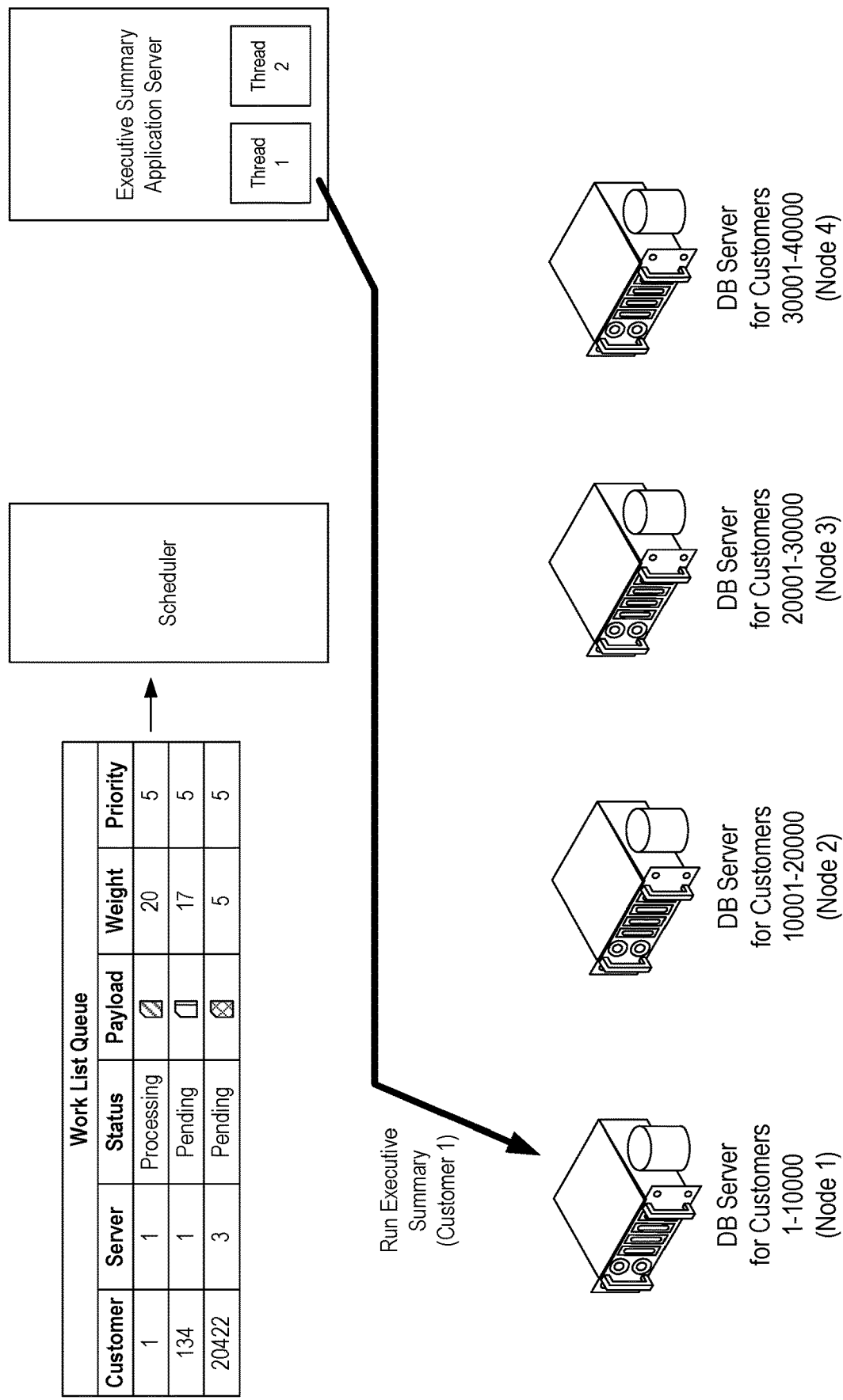
FIG. 25 illustrates execution of work by a first thread of an application server.
Figure 26:
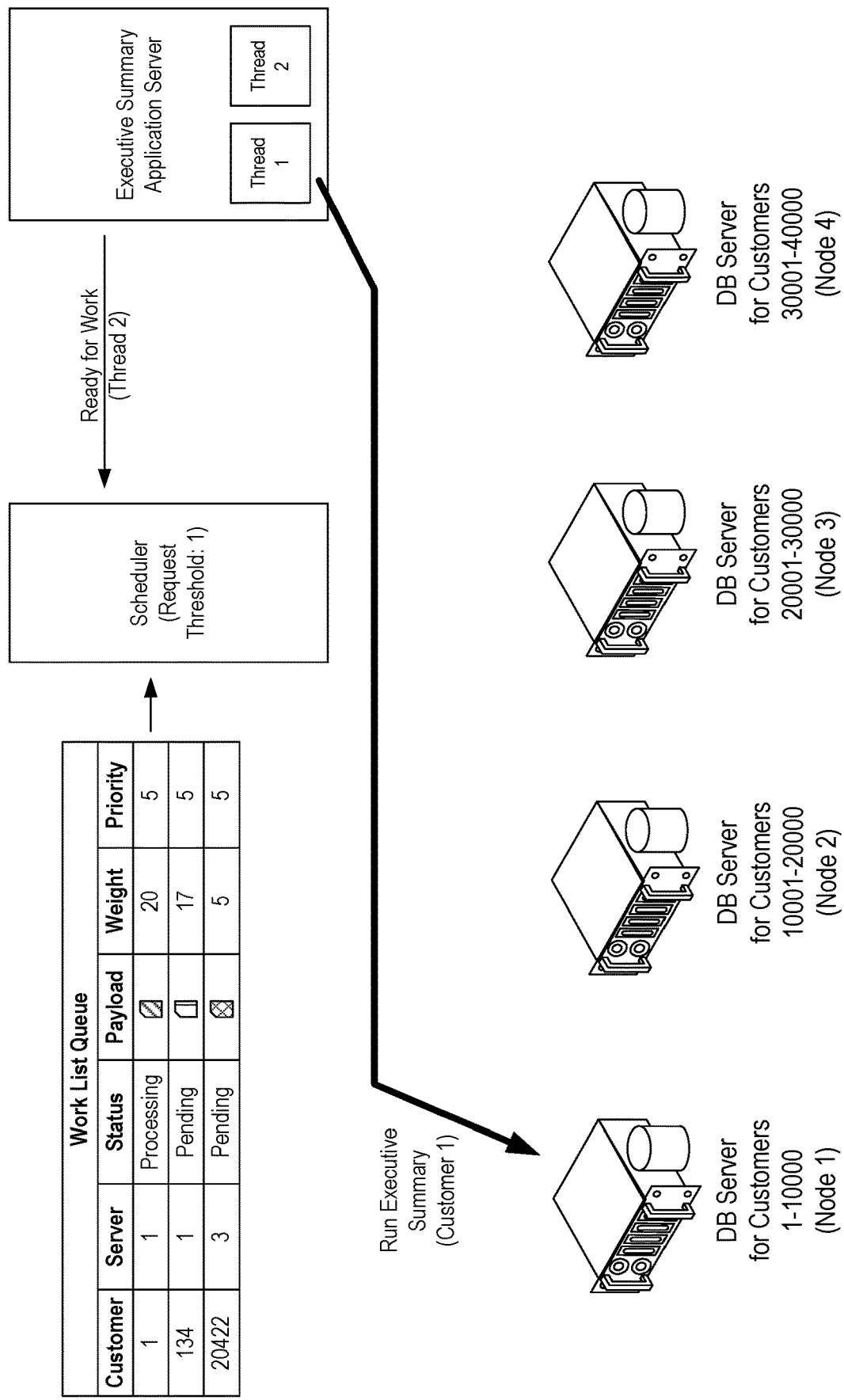
FIG. 26 illustrates communication to a scheduler module of an indication that a thread of an application server is ready for work.
Figure 27:
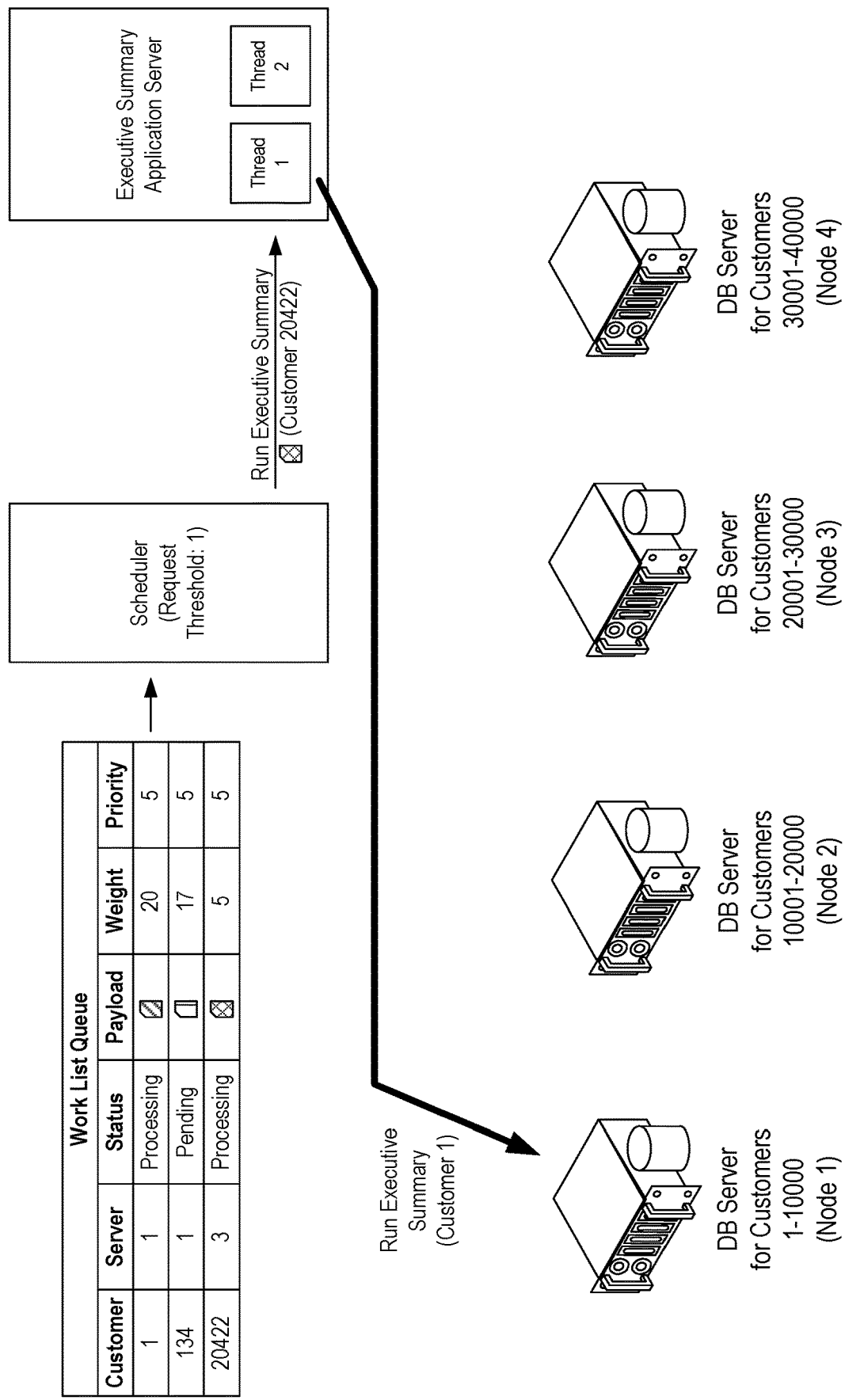
FIG. 27 illustrates communication of work from a scheduler module to an application server.

In any event, upon assignment to thread 1 of the application server, the thread begins to perform the work, accessing the appropriate database server for customer 1 (database server 1, labeled node 1 in the figures), as illustrated in FIG. 25.

Thereafter, the executive summary application server communicates a message to the scheduler module informing the scheduler module that thread 2 of the executive summary application server is ready for work. In response, the scheduler module accesses the work list queue and determines a work item from the work list queue to send to the executive summary application server for execution by thread 2.

As noted above, in accordance with one or more preferred implementations, a scheduler module is configured to prioritize requests with a higher weight. However, in accordance with one or more preferred implementations, a scheduler module is configured to have a request threshold defining a maximum number of work requests which can be sent for performance at one time that require use of the same database server. In the illustrated example, the scheduler module has a request threshold set at one, specifying that only a single work request may be sent out that requires use of a particular database server. Accordingly, although the second work item on the work list queue has the highest weight of any pending work item, it cannot be assigned for execution because it requires the same database server (node 1) as the first work item which is already in "Processing" status.

Figure 28:
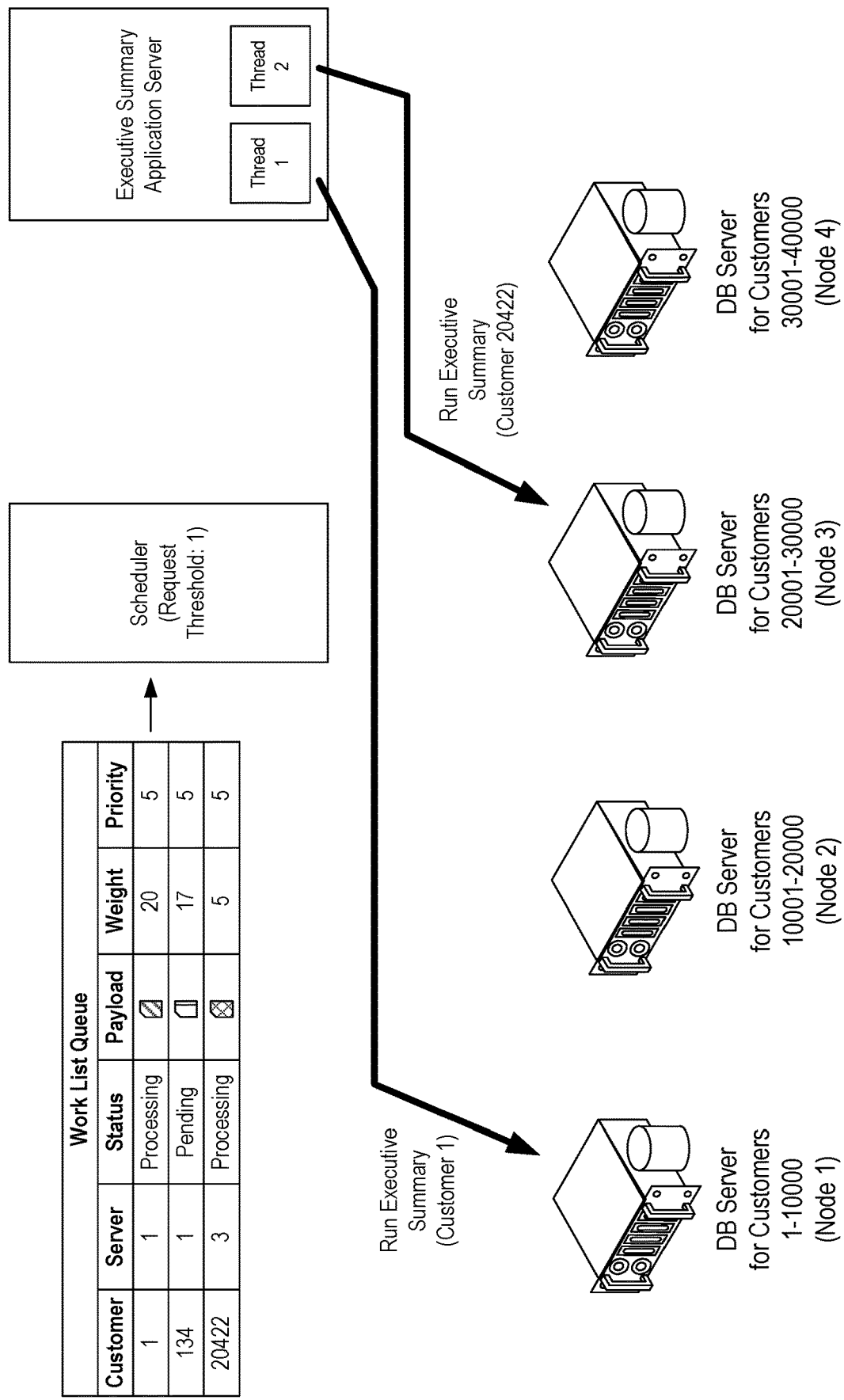
FIG. 28 illustrates execution of work by a second thread of an application server.

Accordingly, the scheduler module determines that the third work item should be assigned for execution, and assigns the corresponding work request of running an executive summary for customer 20422 to thread 2 of the executive summary application server. Thread 2 of the application server begins to perform the work, accessing the appropriate database server for customer 20422 (database server 3, labeled node 3 in the figures), as illustrated in FIG. 28.

It will be appreciated that this particular algorithm for selecting work items from the work list queue is only one exemplary algorithm for facilitating load balancing across database servers.

In accordance with one or more preferred implementations, a work item selection algorithm is configured to utilize a request threshold, as described hereinabove. As noted above, a request threshold set at one specifies that only a single work request may be sent out that requires use of a particular database server. A request threshold set at two specifies that two work requests may be sent out (e.g. in "Processing" status) that require use of the same database server. A request threshold may be set at any value.

In accordance with one or more preferred implementations, a work item selection algorithm utilizing a request threshold determines a number of work items in the work list queue having a "Processing" status that are assigned to a database server, and based thereon determines whether an additional work request for that database server can be assigned. In accordance with one or more preferred implementations, a work item selection algorithm determines, for the server identified in a work item considered for assignment, how many items in the work list with a "Processing" status are already assigned to that database server.

In accordance with one or more preferred implementations, a request threshold is set based on resources available at a database server (e.g. processing, memory, disk input/output rates, etc.). In accordance with one or more preferred implementations, a request threshold is set based on estimated or average requirements of work requests. In accordance with one or more preferred implementations, a request threshold may be dynamically updated by a scheduler server, e.g. based on an amount of time it takes work requests to be completed as compared to their weight.

In accordance with one or more preferred implementations, an individual request threshold is set for each database server. In accordance with one or more preferred implementations, a request threshold applies to every database server. In accordance with one or more preferred implementations, a default request threshold is set which can be overridden by a specific individual request threshold set for a particular database server.

In accordance with one or more preferred implementations, a work item selection algorithm is configured to utilize an application request threshold. In accordance with one or more preferred implementations, a system is configured to allow an application to define its own application request threshold which specifies a number of work requests for that application that can be assigned to a single database server.

In accordance with one or more preferred implementations, a work item selection algorithm is configured to utilize time of day information. For example, in accordance with one or more preferred implementations, a work item selection algorithm is configured to use a first request threshold during the day (e.g. a request threshold of "1" between the hours of 8 AM and 6 PM), and a second request threshold during the evening (e.g. a request threshold of "10" between the hours of 6 PM and 8 AM).

In accordance with one or more preferred implementations, a work item selection algorithm is configured to utilize a weight value for work items to determine whether an additional work request for a database server can be assigned. In accordance with one or more preferred implementations, a maximum weight value is set for each database server.

In accordance with one or more preferred implementations, an individual maximum weight value is set for each database server. In accordance with one or more preferred implementations, a maximum weight value applies to every database server. In accordance with one or more preferred implementations, a default maximum weight value is set which can be overridden by a specific individual maximum weight value set for a particular database server.

In accordance with one or more preferred implementations, a work selection algorithm determines whether assigning a pending work item that requires a database server would cause that database server to exceed its maximum weight value (e.g. based on determining a total weight of "Processing" work items in the work list queue).

In accordance with one or more preferred implementations, a work item selection algorithm determines, for each server for which pending work items exist in the work list queue, a total weight of "processing" work items in the work list queue, and prioritizes work items for the server having the lowest total weight.

In accordance with one or more preferred implementations, a work item selection algorithm determines, for each server for which pending work items exist in the work list queue, a total number of "Processing" work items in the work list queue, and prioritizes work items for the server having the lowest total number of "Processing" work items.

In accordance with one or more preferred implementations, a scheduler module is configured to query database servers to determine an amount of load at each database server, and a work item selection algorithm utilizes actual load information for each database server. In accordance with one or more preferred implementations, a work item selection algorithm determines, for a particular work item, whether the required database server has sufficient capacity to handle the work request at the present time.

In accordance with one or more preferred implementations, a work item selection algorithm utilizes a priority value of work items to prioritize work items.

In accordance with one or more preferred implementations, a work item selection algorithm utilizes a combination of methodologies and factors described herein.

In accordance with one or more preferred implementations, a work item selection algorithm can be configured by an administrative user. In accordance with one or more preferred implementations, a work item selection algorithm can be configured by an administrative user via editing of a configuration file. In accordance with one or more preferred implementations, a custom work item selection algorithm can be provided by an administrative user via a configuration file. In accordance with one or more preferred implementations, a work item selection algorithm can be configured by an administrative user via a user interface.

In accordance with one or more preferred implementations, a work item selection algorithm determines, for each server for which pending work items exist, a number of pending work items requiring that server, and prioritizes work items for the server with the highest number of pending work items.

In accordance with one or more preferred implementations, a work item selection algorithm determines, for each server for which pending work items exist, a total weight of pending work items requiring that server, and prioritizes work items for the server with the highest total weight from pending work items.

Although illustrated herein largely in the context of an application server including two threads, it will be appreciated that methodologies disclosed herein may equally be utilized with application servers having more or less threads. Further, it will be appreciated that communications illustrated between an application server and a scheduler module can be understood as exemplary. In accordance with one or more preferred implementations, a scheduler module is configured to assign work requests to multiple application servers for a single application (as illustrated in FIG. 17), to an application server cluster (as illustrated in FIG. 18), or even to application servers for different applications (as illustrated in FIGS. 19A-B). In accordance with one or more preferred implementations, multiple instances of a scheduler module may be utilized, with each instance being associated with an application for which work is to be assigned, as illustrated in FIG. 19C. In accordance with one or more preferred implementations, a single work list queue may be used with multiple instances of a scheduler module, as illustrated in FIG. 19D.

Figure 29A:
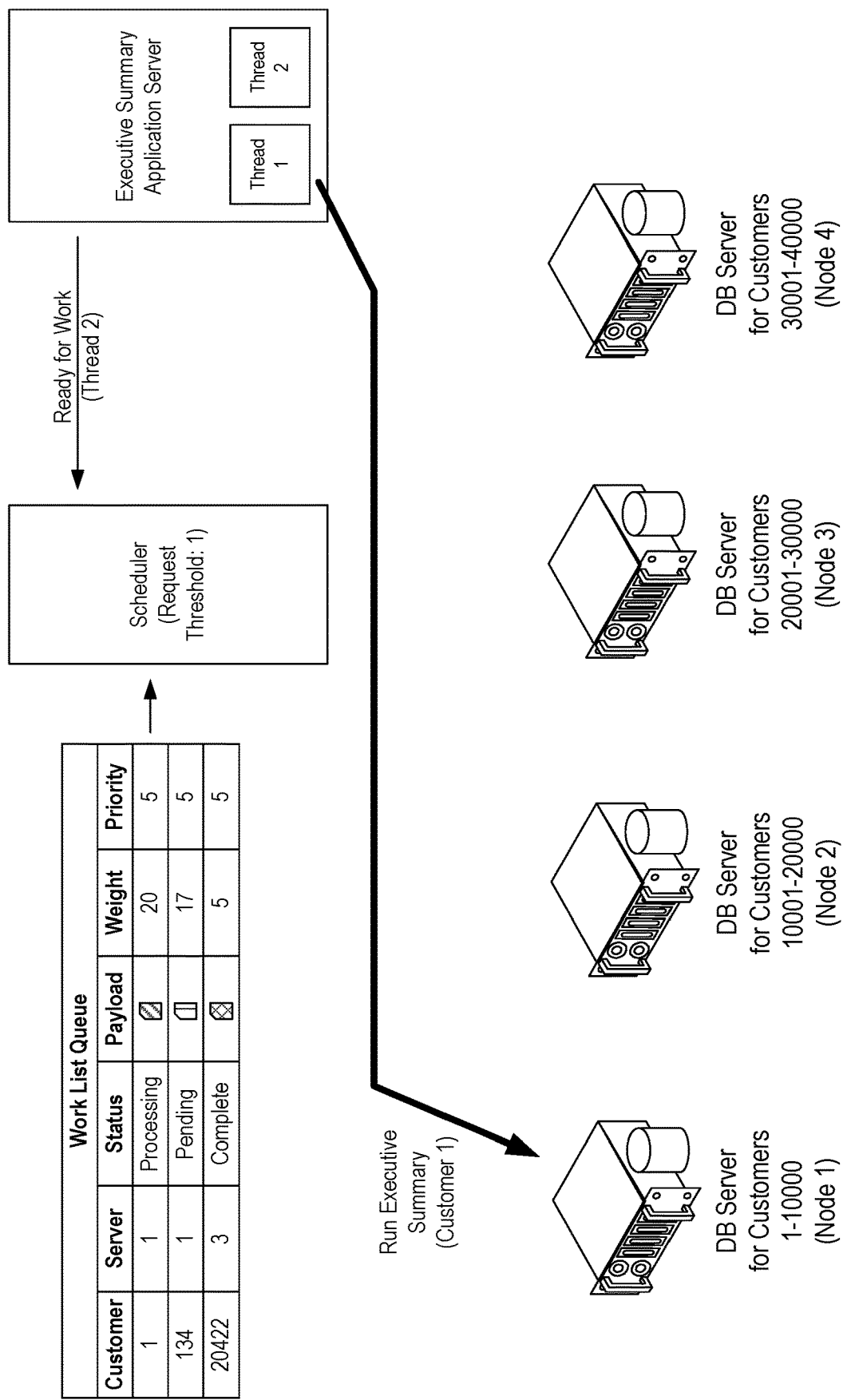
FIG. 29A illustrates communication to a scheduler module of an indication that a second thread of an application server is ready for work.
Figure 29B:
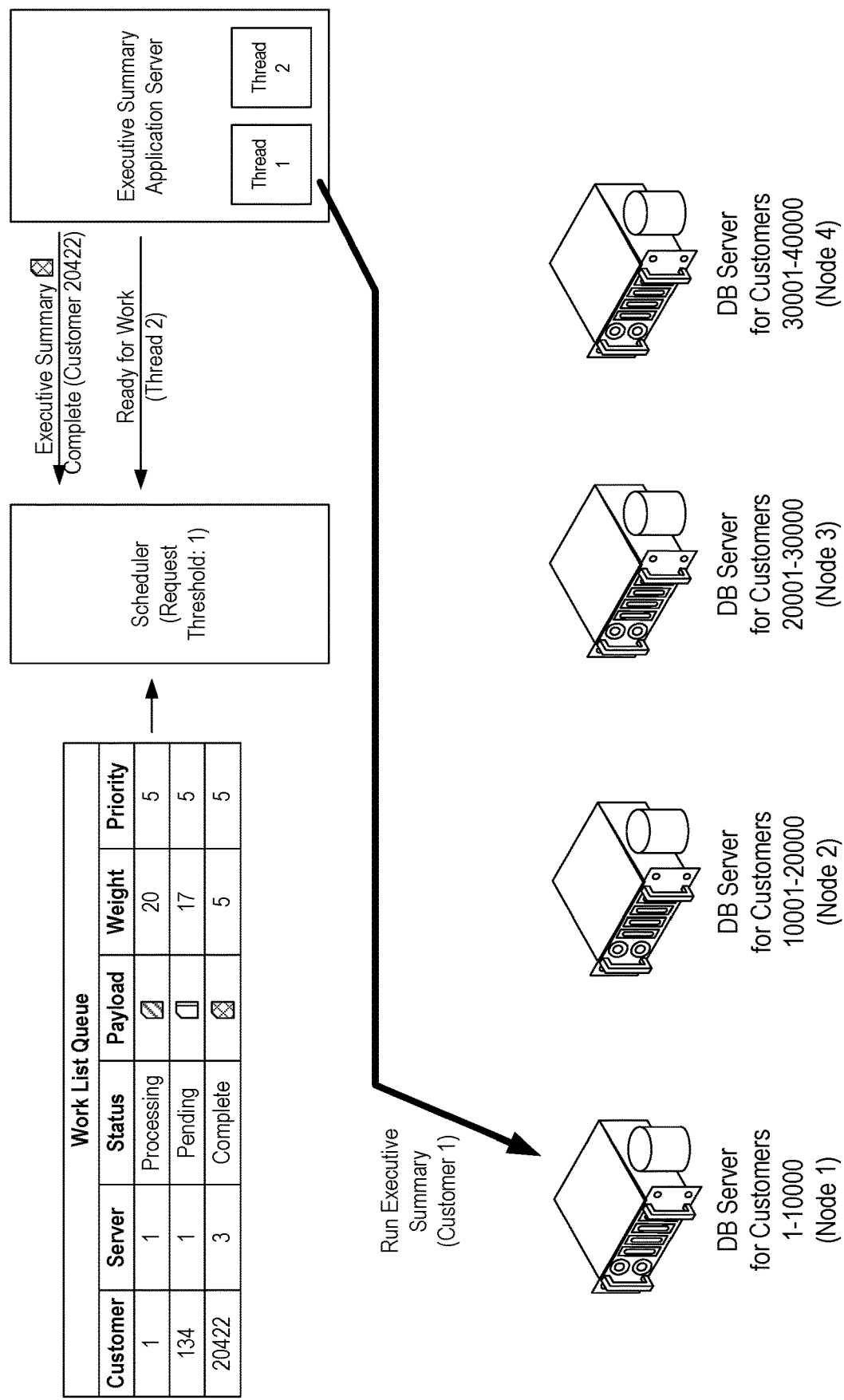
FIG. 29B illustrates communication to a scheduler module of an indication that work is complete and an indication that a thread of an application server is ready for work.

In accordance with one or more preferred implementations, a scheduler module needs to have knowledge of the state of an application server. In accordance with one or more preferred implementations, a scheduler module may keep track of work requests assigned to threads (e.g. in the work list queue or in a separate table), and may understand that a thread has successfully completed the work request it was assigned when the thread communicates that it is ready for more work, as illustrated in FIG. 29A. The schedule module may update the status of a work item to "Complete" based thereon, as illustrated in FIG. 29A. In accordance with one or more preferred implementations, an application server may communicate to the scheduler module that a particular work request has been completed, as illustrated in FIG. 29B. Such a communication may be combined with an indication that a thread is ready for work, or may be separate. In accordance with one or more preferred implementations, an application thread is responsible for updating a status of a work item in the work list queue to "Complete" when it has completed the corresponding work request. In accordance with one or more preferred implementations, only the scheduler module updates the status of work items in the work list queue. In accordance with one or more preferred implementations, only the scheduler module and the auditor module (described hereinbelow) update the status of work items in the work list queue.

In accordance with one or more preferred implementations, an application thread (or another module at the respective application server) notifies the scheduler module when the application successfully completes work. However, if an application thread crashes or aborts, or its application server crashes, the thread or server cannot notify the scheduler module.

Figure 30:
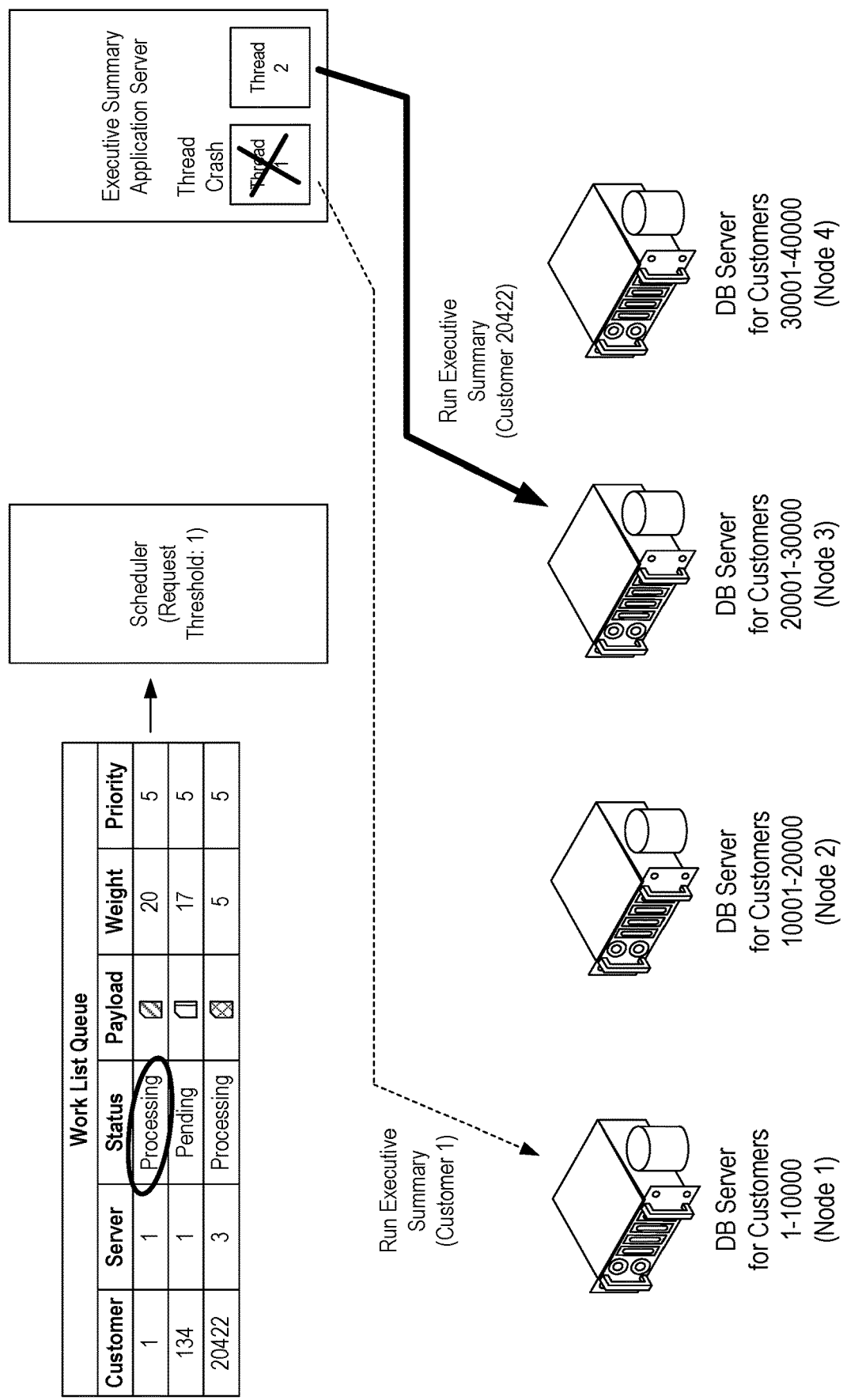
FIG. 30 illustrates a crash of a thread of an application server.

For example, returning to the illustrated example of FIG. 28, if thread 1 crashes (as illustrated in FIG. 30), the scheduler module may have no knowledge of this and the work list queue will still reflect the status of the first work item as "Processing", even though the thread that was executing the corresponding work request has crashed and will not complete.

There are several potential solutions for handling this issue.

As a first solution, in accordance with one or more preferred implementations, a scheduler module can monitor an application by sending out a monitor signal to all instances of an application and attempt to find any threads or processes that have aborted. This is unreliable across servers, as a scheduler module may have a hard time knowing if an application crashed or there is simply a communication problem between the scheduler module and the application. The application may be continuing to execute a work request, but a network error between the scheduler module and the application may cause the scheduler module to think that the application thread or server is down.

As a second solution, in accordance with one or more preferred implementations, a scheduler module can monitor a database server by running administrative queries to see what the database server is currently doing and attempt to determine whether a particular application thread is still running. For example, it could monitor the sessions to see how many sessions are connected to the application server, or it could monitor the structured query language (SQL) that is currently executing. It could be difficult to determine what is happing based on SQL unless the scheduler module knows about all the SQL that an application will run. Session monitoring is difficult as well, but one possibility is that the application server can name the session so that the scheduler can determine what the application is doing by looking at the session names. For example, a session could be named "ExecutiveSummary-Request2". However, not all databases may support this. Additionally, it makes the application more complicated because of "connection pooling". Typically, an application simply asks for a connection from a pool of connections to the database because it is expensive to create new connections. A pool provides a collection of already opened connections. Therefore, with pooling you do not know what each connection will be doing until you pull it out of the pool, and a single connection will be used for many requests/sessions.

A third and preferred solution involves the use of a database application lock. In accordance with one or more preferred implementations, a database application lock is engaged by an application thread prior to accessing the database.

Most database vendors provide a mechanism to expose the underlying ability to "lock" a resource. To provide ACID (atomicity, consistency, isolation, durability) properties, the database will often "lock" a table to prevent simultaneous queries from putting the table into an inconsistent state. An application lock is simply a named lock that doesn't lock any database resources. If two applications request the lock at the same time, the database guarantees that only one application acquires the lock. This provides a simple mechanism for synchronization between servers and processes.

Figure 31:
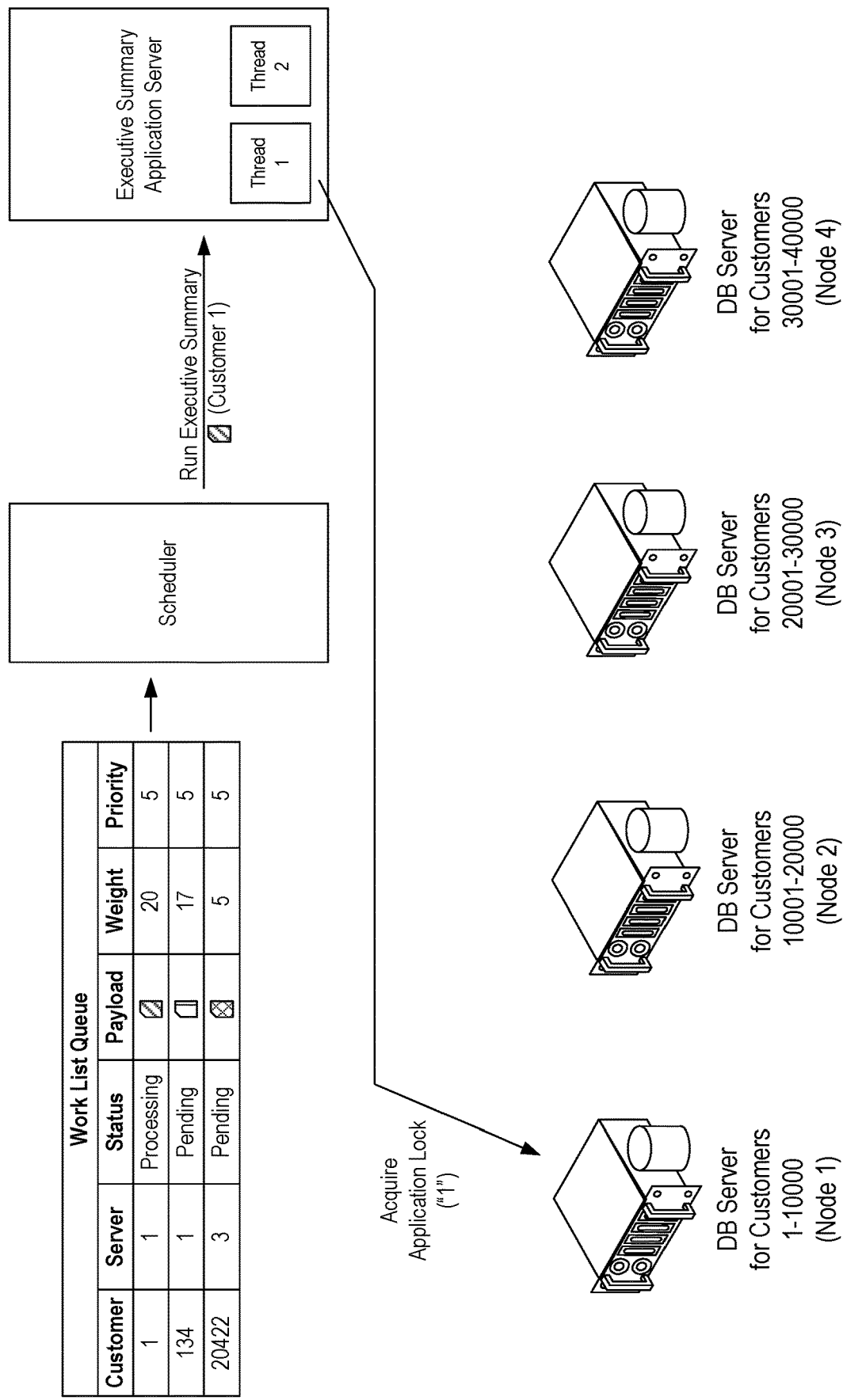
FIG. 31 illustrates acquisition of an application lock by a thread of an application server.

FIG. 31 illustrates an exemplary lock implementation in accordance with one or more preferred implementations in which, prior to accessing database server 1 to run an executive summary for customer 1, thread 1 of the executive summary application server acquires an application lock. Although this application lock is illustrated as application lock "1", it will be appreciated that this application lock may be provided with a more detailed name providing more detail regarding the thread that acquired the lock, e.g. the lock may be "Executive Summary Thread 1" or "Executive Summary for Customer 1".

Figure 32:
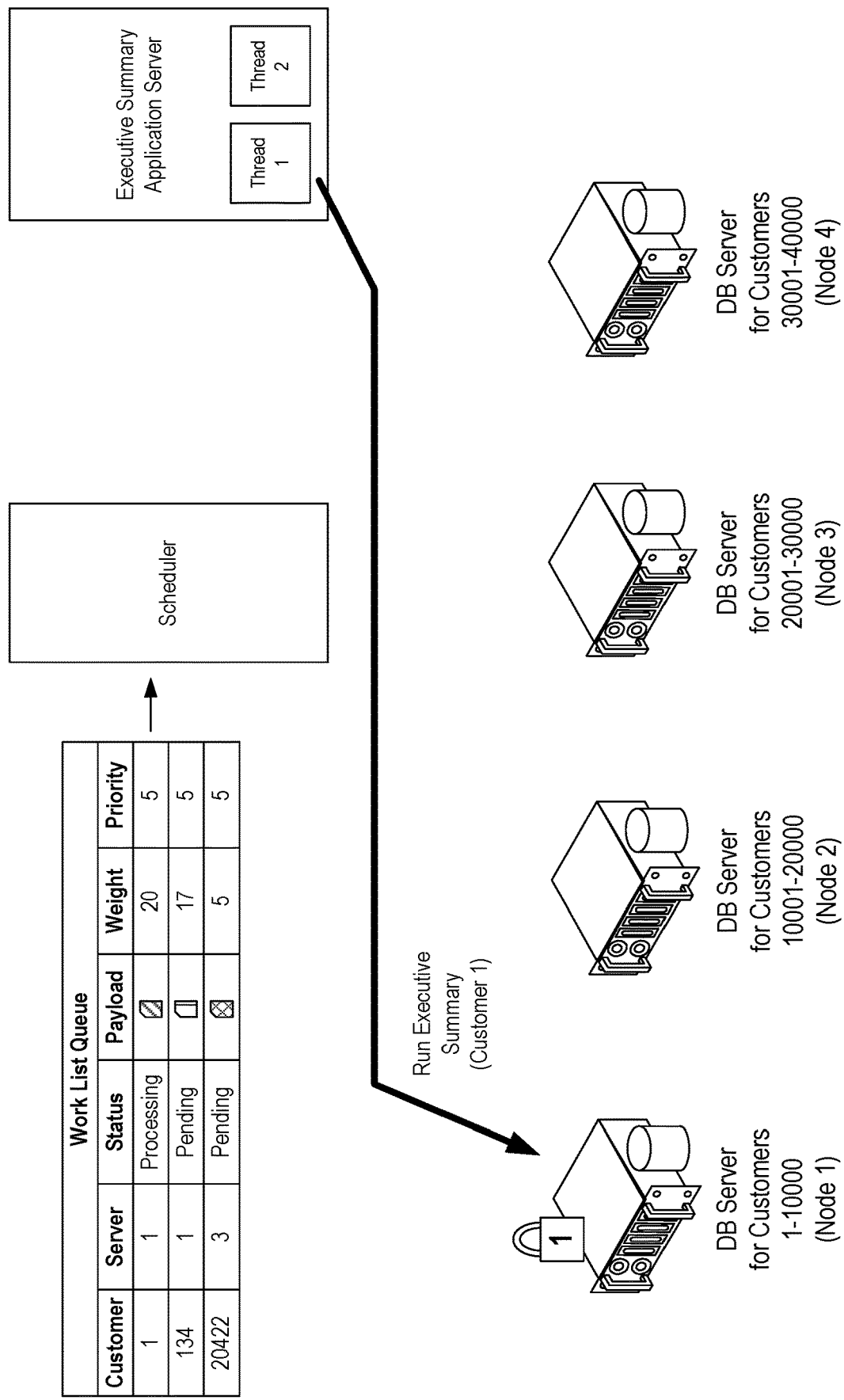
FIG. 32 illustrates execution of work by a thread of an application server following acquisition of an application lock.

Once the application lock has been acquired, the application thread can proceed with accessing the database server, as illustrated in FIG. 32.

In accordance with one or more preferred implementations, an application lock acquired by an application thread is configured to disappear (or be unlocked) if the application thread crashes or the application server crashes.

Figure 33:
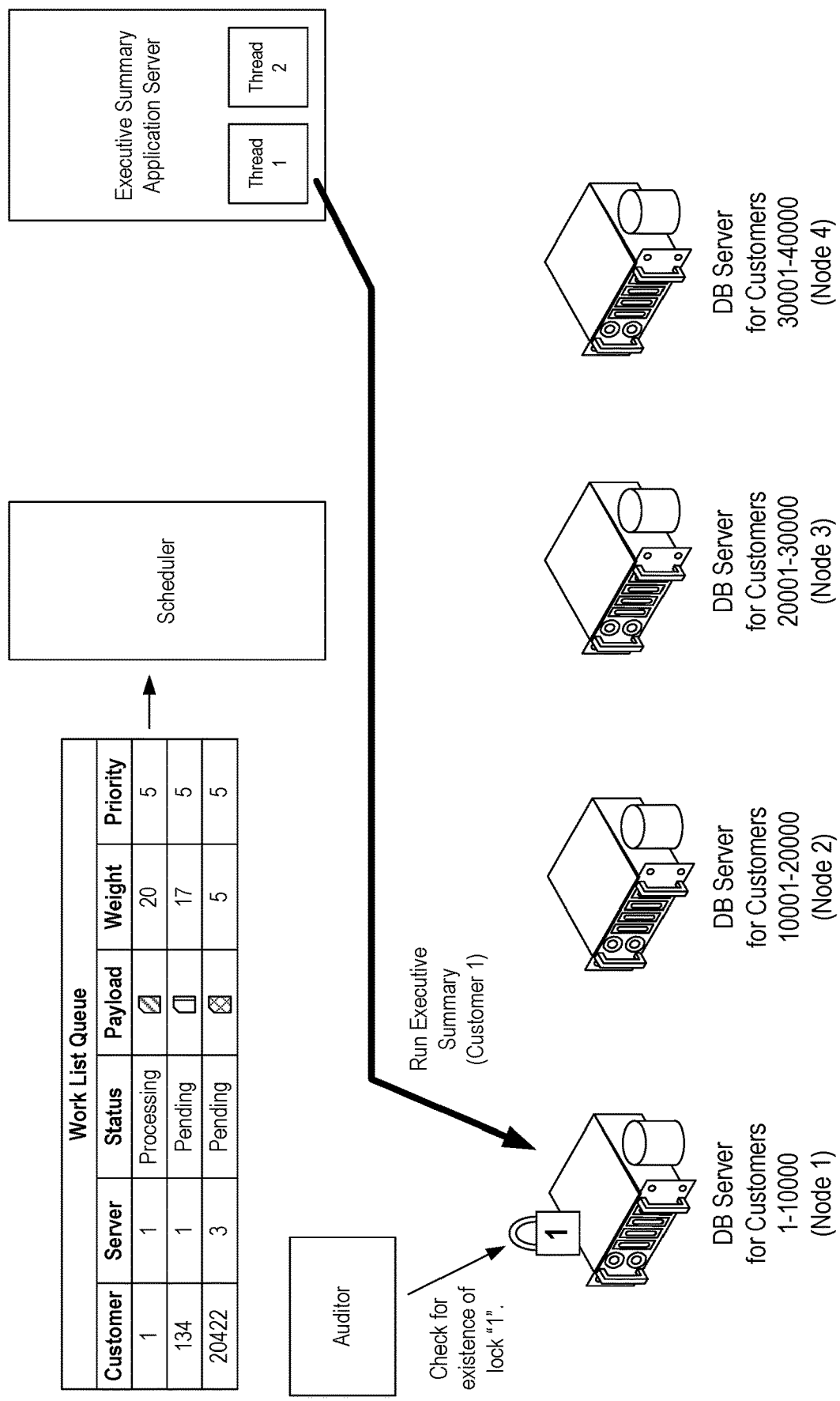
FIG. 33 illustrates checking for the existence of an application lock by an auditor module.

In accordance with one or more preferred implementations, an auditor module is configured to check for the existence of application locks to determine whether an application thread has crashed, as illustrated in FIG. 33. In accordance with one or more preferred implementations, an auditor module is configured to periodically check for the existence of application locks for "Processing" work items. In accordance with one or more preferred implementations, an auditor module is configured to check for existence of application locks for "Processing" work items which have not been completed after an estimated amount of time for completion. In accordance with one or more preferred implementations, a scheduler module is configured to instruct the auditor module to check for the existence of one or more application locks.

Figure 34:
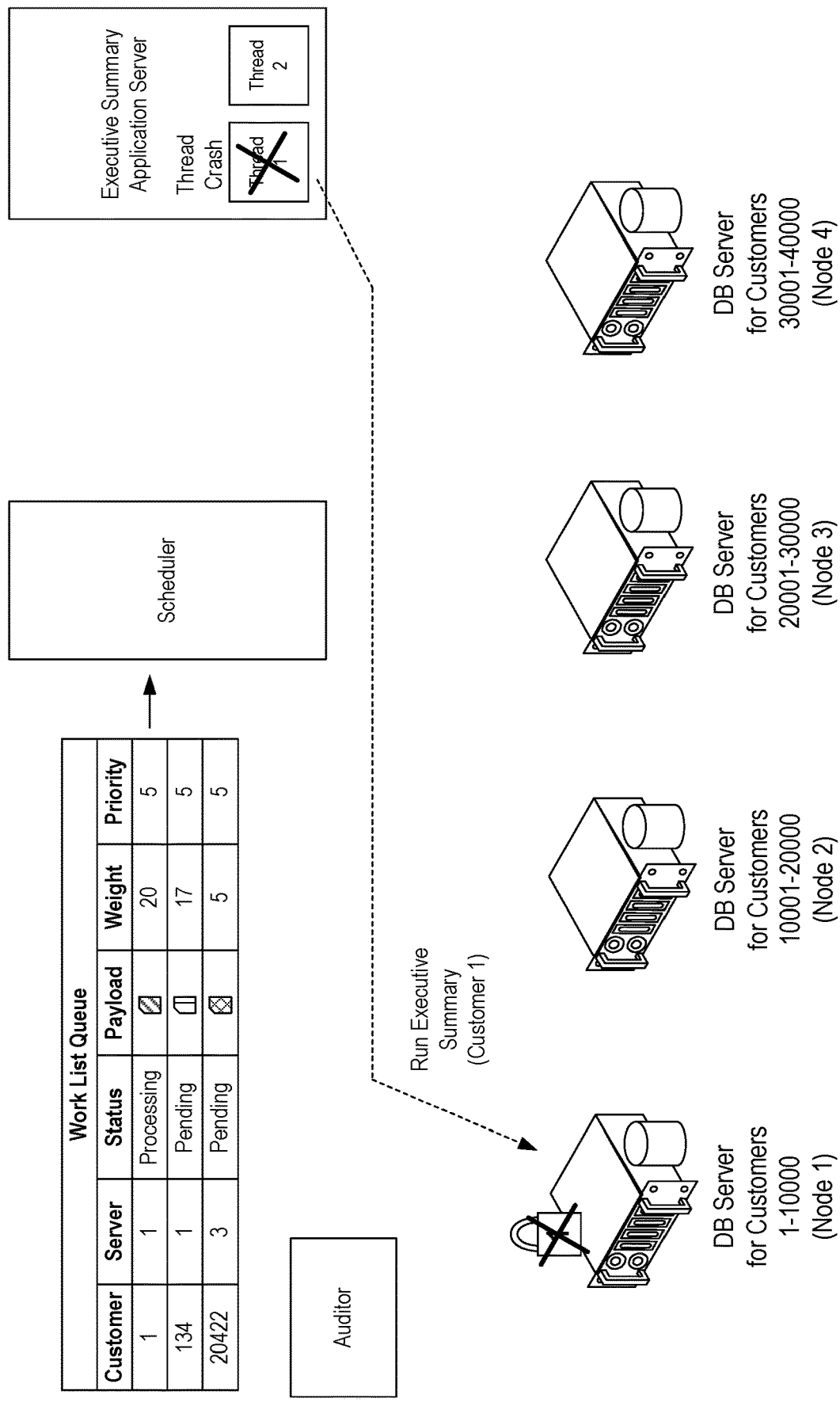
FIG. 34 illustrates a crash of a thread of an application server.
Figure 35:
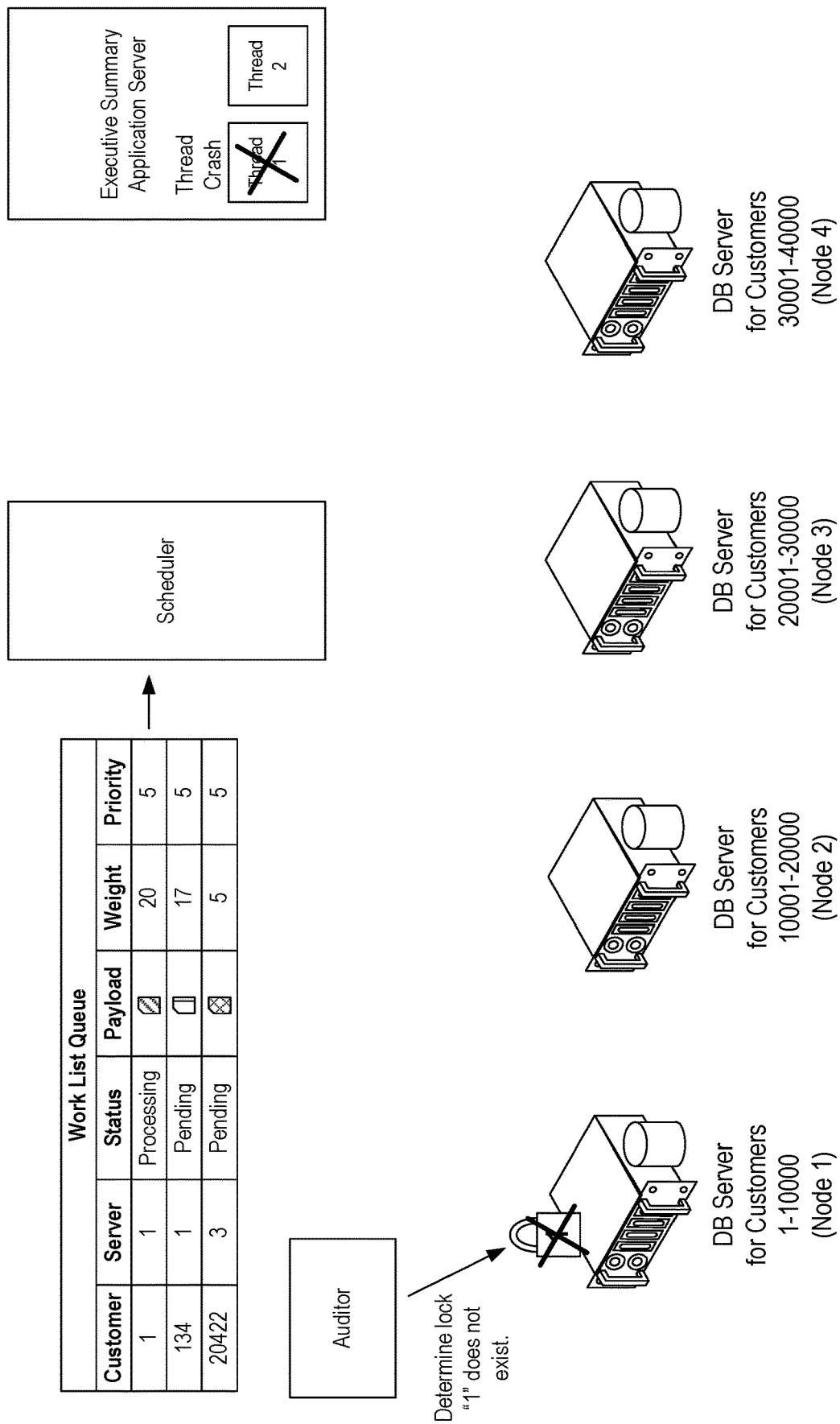
FIG. 35 illustrates determination by an auditor module that an application lock does not exist.
Figure 36:
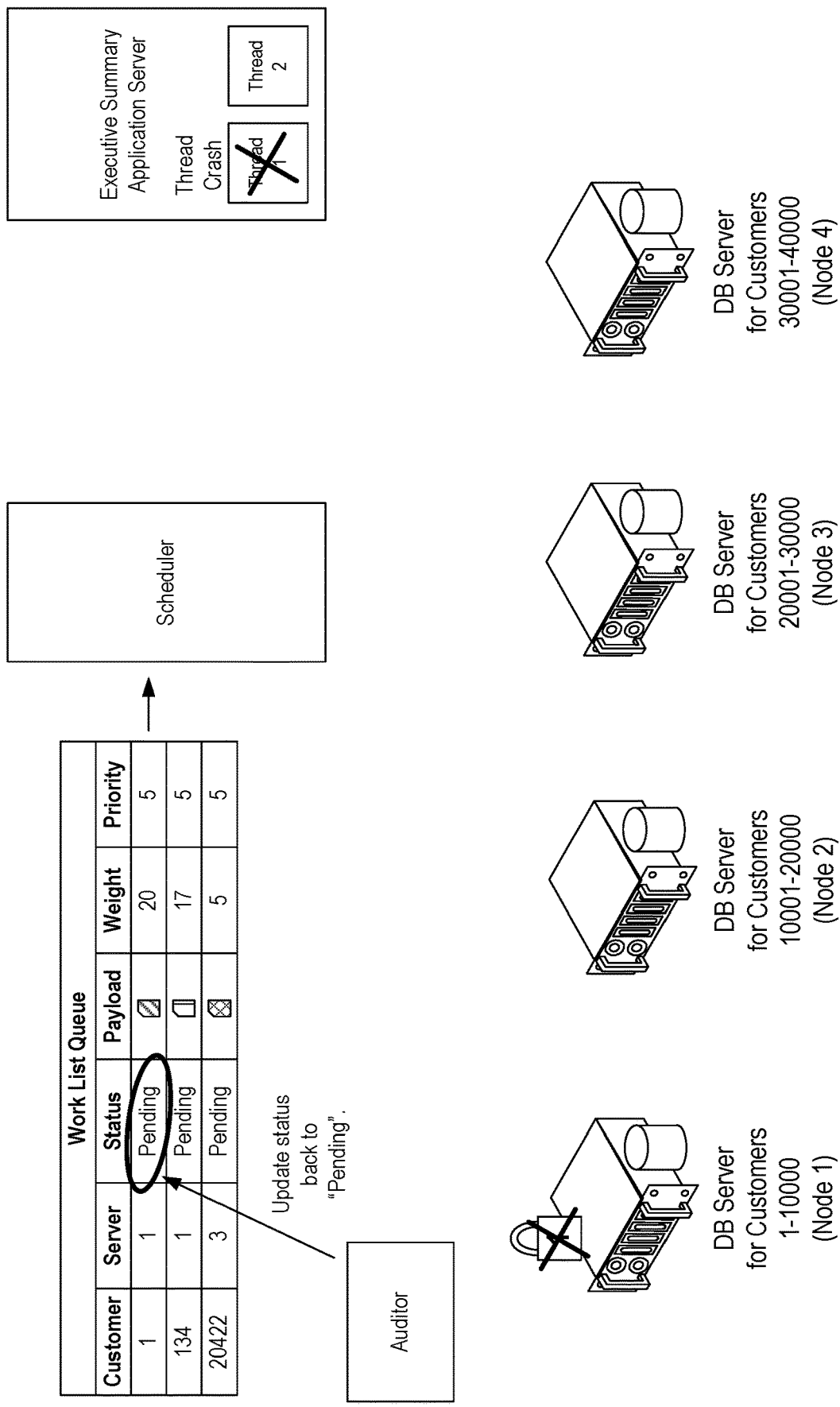
FIG. 36 illustrates updating of a status of a work item.

Returning to the example of FIG. 33, if thread 1 of the executive summary application server crashes (as illustrated in FIG. 34), then the application lock will be missing, and the next time the auditor module checks for the existence of this application lock the auditor module will determine that it is missing (as illustrated in FIG. 35) and consequently update the status of the corresponding work item (or communicate a message to the scheduler module to do so). Notably, in this regard, the work list queue may include an indication of the thread that was working on the work item, or this information may be maintained elsewhere by the scheduler module.

There are two race conditions that need to be considered for some implementations utilizing an application lock.

As a first possible race condition, consider the situation where a scheduler module or auditor module determines that a work item is "Processing" and starts to check if the corresponding application lock exists, but concurrently the corresponding work request is completed, the lock is removed, and the work item is marked "Completed" before the auditor module can check the lock. When the auditor module checks the lock, it sees that it is freed, and assumes that the process has crashed and incorrectly effects setting of the work item back to "Pending", re-queueing the work even though it has already completed.

In accordance with one or more preferred implementations, in order to guard against this race condition, a system will update the status of a work item to "Complete" prior to freeing the corresponding application lock, and when the scheduler module or auditor module detects a potential crash based on a free application lock and is getting ready to change the status of the corresponding work item to "Pending" (or re-queue the work item), it will first re-check the status of the corresponding work item to ensure it is still "Processing". If the status is "Complete", then it will not change the status to "Pending" (or re-queue the work item).

In accordance with one or more preferred implementations, in order to guard against this race condition, when the scheduler module or auditor module detects a potential crash based on a free application lock and is getting ready to change the status of the corresponding work item to "Pending", it will first re-check the status of the corresponding work item to ensure it is still "Processing". If the status is "Complete", then it will not change the status to "Pending".

As a second possible race condition, consider the situation where a work item has been assigned to an application thread, and the scheduler module or auditor module determines that a work item is "Processing" and starts to check if the corresponding application lock exists, but the application lock has not yet been created (but is created shortly thereafter). When the auditor module checks the lock, it sees that it is freed, and assumes that the process has crashed and incorrectly effects setting of the work item back to "Pending", re-queueing the work even though it is currently being performed.

In accordance with one or more preferred implementations, a scheduler guard time is set which ensures that a scheduler module or auditor module will not look for application locks for any work item which has just been assigned in an amount of time equal to the scheduler guard time. In accordance with one or more preferred implementations, this is set to several minutes (e.g., two, three, or five minutes). In accordance with one or more preferred implementations, this is configurable by an administrative user (e.g. via a user interface or a configuration file).

In accordance with one or more preferred implementations, a dequeue algorithm for selecting a work item utilizes a database table as a queue. In accordance with one or more preferred implementations, a dequeue algorithm is performed in one SQL statement, atomically, so that the queue does not get corrupted when there are many simultaneous enqueue and dequeue operations.

In accordance with one or more preferred implementations, a dequeue algorithm involves, first, for all the queue items that are currently pending, determining a first set of all queue items that are to be processed on database servers that would not be maxed out (e.g. would not exceed a request threshold) if the respective queue item was assigned. Next, for each respective database server corresponding to one of the found queue items in the first set, summing the weights of all of the queue items currently being processed by the respective database server to arrive at a current total weight for the respective database. Then, selecting the database server having the lowest calculated current total weight, and selecting the pending queue item which is to be processed on that selected database server which has the highest weight.

In accordance with one or more preferred implementations, a dequeue algorithm involves, first, for all the queue items that are currently pending, determining a first set of all queue items that are to be processed on database servers that would not be maxed out (e.g. would not exceed a request threshold) if the respective queue item was assigned. Next, for each respective database server corresponding to one of the found queue items in the first set, summing the weights of all of the queue items currently being processed by the respective database server to arrive at a current total weight for the respective database. Then, selecting the database server having the highest calculated current total weight, and selecting the pending queue item which is to be processed on that selected database server which has the highest weight.

In accordance with one or more preferred implementations, a dequeue algorithm involves, first, for all the queue items that are currently pending, determining a first set of all queue items that are to be processed on database servers that would not be maxed out (e.g. would not exceed a request threshold or maximum weight value) if the respective queue item was assigned. Next, for each respective database server corresponding to one of the found queue items in the first set, summing the weights of all of the queue items currently being processed by the respective database server to arrive at a current total weight for the respective database. Then, selecting the database server having the lowest calculated current total weight, and selecting the pending queue item which is to be processed on that selected database server which has the highest weight.

In accordance with one or more preferred implementations, a dequeue algorithm involves, first, for all the queue items that are currently pending, determining a first set of all queue items that are to be processed on database servers that would not be maxed out (e.g. would not exceed a request threshold or maximum weight value) if the respective queue item was assigned. Next, for each respective database server corresponding to one of the found queue items in the first set, summing the weights of all of the queue items currently being processed by the respective database server to arrive at a current total weight for the respective database. Then, selecting the database server having the highest calculated current total weight, and selecting the pending queue item which is to be processed on that selected database server which has the highest weight.

In accordance with one or more preferred implementations, an implementation of a queue algorithm utilizes a separate table for a payload for efficiency.

FIG. 37 illustrates an exemplary dequeue algorithm in accordance with one or more preferred implementations.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method providing a technical solution to a technical problem of distributing non-transactional workload in the form of online analytical processing (OLAP) load across multiple database servers, the method comprising:
    (a) receiving, at a scheduler server, a plurality of asynchronous work requests;
    (b) adding, by the scheduler server, each of the received asynchronous work requests to a work list queue as a work item, each respective work item including
        (i) an indication of a customer for the corresponding work request,
        (ii) an indication of a database server required for execution of the corresponding work request,
        (iii) an indication of a status of the respective work item, and
        (iv) an indication of a weight value representing a complexity of the corresponding work request;
    (c) receiving, at a scheduler module of the scheduler server, a message from an application server indicating that a first thread of the application server is ready for work;
    (d) determining, by the scheduler module of the scheduler server, a first work item from the work list queue to select for performance by the first thread of the application server, such determining comprising
        (i) selecting a first set of work items in the work list queue by
            (A) determining, for each respective work item in the work list queue indicated to have a pending status, whether assignment of the corresponding work request to the database server indicated for the respective work item would cause that database server to exceed a request threshold of that database server, and
            (B) adding to the first set of work items each work item for which it was determined that assignment of the corresponding work request to the database server indicated for that work item would not cause that database server to exceed the request threshold of that database server,
        (ii) selecting a target database server by
            (A) for each respective database server indicated for one of the first set of work items, calculating a current total weight value for the respective database server by summing indicated weight values for all work items of the work list queue that
                (I) indicate assignment to that respective database server, and
                (II) are indicated to have a processing status,
            (B) selecting the database server having the lowest calculated current total weight value, and
        (iii) selecting the first work item by
            (A) determining, from the first set of work items, a second set of work items that has the selected target database server indicated, and
            (B) selecting, from the second set of work items, the work item that has the highest indicated weight value as the first work item; and
    (e) communicating, from the scheduler module to the application server, a communication instructing the application server to execute the work request corresponding to the selected first work item utilizing the first thread of the application server.

2. The method of claim 1, wherein the method further comprises updating an indicated status of the first work item to processing.

3. The method of claim 1, wherein the method further comprises performing, by the first thread of the application server, work to complete the work request corresponding to the selected first work item.

4. The method of claim 1, wherein performing, by the first thread of the application server, work to complete the work request corresponding to the selected first work item comprises accessing the database server indicated in the first work item.

5. The method of claim 1, wherein performing, by the first thread of the application server, work to complete the work request corresponding to the selected first work item comprises accessing the database server indicated in the first work item, and wherein the method further comprises, prior to accessing the database server indicated in the first work item, acquiring, by the first thread of the application server, an application lock for the database server indicated in the first work item.

6. The method of claim 1, wherein the method further comprises checking, by an auditor module of the scheduler server, for the existence of an application lock on the database server indicated in the first work item to attempt to determine whether the first thread of the first application server has crashed.

7. The method of claim 1, wherein the method further comprises
   (a) checking, by an auditor module of the scheduler server, for the existence of an application lock on the database server indicated in the first work item to attempt to determine whether the first thread of the first application server has crashed; and
   (b) based thereon, effecting updating of an indicated status of the first work item to pending.

8. The method of claim 1, wherein the method further comprises completing, by the first thread of the application server, the work request corresponding to the first work item.

9. The method of claim 1, wherein the method further comprises completing, by the first thread of the application server, the work request corresponding to the first work item, and communicating, from the application server to the scheduler module, a message indicating that the first thread of the application server is ready for work.

10. The method of claim 1, wherein the method further comprises receiving, at the scheduler module of the scheduler server, a message from the application server indicating that the first thread of the application server is ready for work, and based thereon updating an indicated status of the first work item to complete.

11. The method of claim 1, wherein the scheduler server comprises a plurality of work list queues, each work list queue being a work list queue for a different application.

12. The method of claim 1, wherein the work list queue includes work items for a plurality of different applications, and each work item in the work list queue includes an indication of a needed application.

13. The method of claim 1, wherein the scheduler server comprises a plurality of scheduler modules, each scheduler module being a scheduler module for a different application.

14. The method of claim 1, wherein the received plurality of asynchronous work requests comprises a work request based on a timer based job.

15. The method of claim 1, wherein the received plurality of asynchronous work requests comprises a work request based on a user request from a web site.

16. The method of claim 1, wherein the target database server comprises a structured query language (SQL) server.

17. The method of claim 1, wherein the method further comprises
   (a) receiving, at the scheduler module of the scheduler server, a message from the application server indicating that a second thread of the application server is ready for work;
   (b) determining, by the scheduler module of the scheduler server, a second work item from the work list queue to select for performance by the second thread of the application server, such determining comprising
      (i) selecting a third set of work items in the work list queue by
         (A) determining, for each respective work item in the work list queue indicated to have a pending status, whether assignment of the corresponding work request to the database server indicated for the respective work item would cause that database server to exceed a request threshold of that database server, and
         (B) adding to the third set of work items each work item for which it was determined that assignment of the corresponding work request to the database server indicated for that work item would not cause that database server to exceed the request threshold of that database server,
      (ii) selecting a second target database server by
         (A) for each respective database server indicated for one of the third set of work items, calculating a current total weight value for the respective database server by summing indicated weight values for all work items of the work list queue that
            (I) indicate assignment to that respective database server, and
            (II) are indicated to have a processing status,
         (B) selecting the database server having the lowest calculated current total weight value, and
      (iii) selecting the second work item by
         (A) determining, from the third set of work items, a fourth set of work items that has the selected target database server indicated, and
         (B) selecting, from the fourth set of work items, the work item that has the highest indicated weight value as the first work item; and
   (c) communicating, from the scheduler module to the application server, a communication instructing the application server to execute the work request corresponding to the selected second work item utilizing the second thread of the application server.

18. The method of claim 1, wherein the method further comprises
   (a) receiving, at the scheduler module of the scheduler server, a message from a second application server indicating that a second thread of the second application server is ready for work;
   (b) determining, by the scheduler module of the scheduler server, a second work item from the work list queue to select for performance by the second thread of the second application server, such determining comprising
      (i) selecting a third set of work items in the work list queue by
         (A) determining, for each respective work item in the work list queue indicated to have a pending status, whether assignment of the corresponding work request to the database server indicated for the respective work item would cause that database server to exceed a request threshold of that database server, and
         (B) adding to the third set of work items each work item for which it was determined that assignment of the corresponding work request to the database server indicated for that work item would not cause that database server to exceed the request threshold of that database server,
      (ii) selecting a second target database server by
         (A) for each respective database server indicated for one of the third set of work items, calculating a current total weight value for the respective database server by summing indicated weight values for all work items of the work list queue that
(I) indicate assignment to that respective database server, and
(II) are indicated to have a processing status,
(B) selecting the database server having the lowest calculated current total weight value, and
(iii) selecting the second work item by
(A) determining, from the third set of work items, a fourth set of work items that has the selected target database server indicated, and
(B) selecting, from the fourth set of work items, the work item that has the highest indicated weight value as the first work item; and
(c) communicating, from the scheduler module to the second application server, a communication instructing the second application server to execute the work request corresponding to the selected second work item utilizing the second thread of the second application server.

19. A method providing a technical solution to a technical problem of distributing non-transactional workload in the form of online analytical processing (OLAP) load across multiple database servers, the method comprising:
(a) receiving, at a scheduler server, a plurality of asynchronous work requests;
(b) adding, by the scheduler server, each of the received asynchronous work requests to a work list queue as a work item, each respective work item including
(i) an indication of a customer for the corresponding work request,
(ii) an indication of a database server required for execution of the corresponding work request,
(iii) an indication of a status of the respective work item, and
(iv) an indication of a weight value representing a complexity of the corresponding work request;
(c) receiving, at a scheduler module of the scheduler server, a message from an application server cluster indicating that a first thread of the application server cluster is ready for work;
(d) determining, by the scheduler module of the scheduler server, a first work item from the work list queue to select for performance by the first thread of the application server cluster, such determining comprising
(i) selecting a first set of work items in the work list queue by
(A) determining, for each respective work item in the work list queue indicated to have a pending status, whether assignment of the corresponding work request to the database server indicated for the respective work item would cause that database server to exceed a request threshold of that database server, and
(B) adding to the first set of work items each work item for which it was determined that assignment of the corresponding work request to the database server indicated for that work item would not cause that database server to exceed the request threshold of that database server, and
(ii) selecting a target database server by
(A) for each respective database server indicated for one of the first set of work items, calculating a current total weight value for the respective database server by summing indicated weight values for all work items of the work list queue that
(I) indicate assignment to that respective database server, and
(II) are indicated to have a processing status,
(B) selecting the database server having the lowest calculated current total weight value, and
(iii) selecting the first work item by
(A) determining, from the first set of work items, a second set of work items that has the selected target database server indicated, and
(B) selecting, from the second set of work items, the work item that has the highest indicated weight value as the first work item; and
(e) communicating, from the scheduler module to the application server cluster, a communication instructing the application server cluster to execute the work request corresponding to the selected first work item utilizing the first thread of the application server cluster.

20. A method providing a technical solution to a technical problem of distributing non-transactional workload in the form of online analytical processing (OLAP) load across multiple database servers, the method comprising:
(a) receiving, at a scheduler server, a plurality of asynchronous work requests;
(b) adding, by the scheduler server, each of the received asynchronous work requests to a work list queue as a work item, each respective work item including
(i) an indication of a customer for the corresponding work request,
(ii) an indication of a database server required for execution of the corresponding work request,
(iii) an indication of a status of the respective work item, and
(iv) an indication of a weight value representing a complexity of the corresponding work request;
(c) receiving, at a scheduler module of the scheduler server, a message from an application server indicating that a thread of the application server is ready for work;
(d) determining, by the scheduler module of the scheduler server, a first work item from the work list queue to select for execution by the application server, such determining comprising
(i) selecting a first set of work items in the work list queue by
(A) determining, for each respective work item in the work list queue indicated to have a pending status, whether assignment of the corresponding work request to the database server indicated for the respective work item would cause that database server to exceed a request threshold of that database server, and
(B) adding to the first set of work items each work item for which it was determined that assignment of the corresponding work request to the database server indicated for that work item would not cause that database server to exceed the request threshold of that database server,
(ii) selecting a target database server by
(A) for each respective database server indicated for one of the first set of work items, calculating a current total weight value for the respective database server by summing indicated weight values for all work items of the work list queue that
(I) indicate assignment to that respective database server, and
(II) are indicated to have a processing status, (B) selecting the database server having the lowest calculated current total weight value, and
(iii) selecting the first work item by
(A) determining, from the first set of work items, a second set of work items that has the selected target database server indicated, and
(B) selecting, from the second set of work items, the work item that has the highest indicated weight value as the first work item; and
(e) communicating, from the scheduler module to the application server, a communication instructing the application server to execute the work request corresponding to the selected first work item.

\* \* \* \* \*